United States Patent
Alkhabbaz et al.

(10) Patent No.: US 10,931,790 B2
(45) Date of Patent: *Feb. 23, 2021

(54) SYSTEMS AND METHODS FOR SECURELY TRANSFERRING SELECTIVE DATASETS BETWEEN TERMINALS WITH MULTI-APPLICATIONS SUPPORT

(71) Applicant: Saudi Arabian Oil Company, Dhahran (SA)

(72) Inventors: Fouad M. Alkhabbaz, Dhahran (SA); Maatoug Al-Maatoug, Dhahran (SA); Zakarya A. Abu Al Saud, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 125 days.

This patent is subject to a terminal disclaimer.

(21) Appl. No.: 16/502,212

(22) Filed: Jul. 3, 2019

(65) Prior Publication Data

US 2019/0356759 A1 Nov. 21, 2019

Related U.S. Application Data

(63) Continuation-in-part of application No. 15/679,669, filed on Aug. 17, 2017, now Pat. No. 10,389,685.

(51) Int. Cl.
 *H04L 29/06* (2006.01)
(52) U.S. Cl.
 CPC .............. *H04L 67/40* (2013.01); *H04L 67/42* (2013.01); *H04L 69/161* (2013.01)
(58) Field of Classification Search
 CPC . H04L 51/12; H04L 63/0245; H04L 63/0263; H04L 63/0428; H04L 67/40; H04L 67/42; H04L 67/06; H04L 69/161
 See application file for complete search history.

(56) References Cited

U.S. PATENT DOCUMENTS 3,946,220 A 3/1976 Brobeck et al.
6,269,402 B1 7/2001 Lin et al.
(Continued)

FOREIGN PATENT DOCUMENTS

WO 2010011180 A1 1/2010

OTHER PUBLICATIONS

Search Query Report from IP.com (performed Dec. 22, 2020) (Year: 2020).*

(Continued)

*Primary Examiner* — Sharon S Lynch
(74) *Attorney, Agent, or Firm* — Bracewell LLP; Constance G. Rhebergen; Vivek P. Shankam

(57) ABSTRACT

Receiving, by a first communication device, an internet protocol (IP) packet via a first synchronous multi-application application programming interface (API) running on a first computer, dividing, by a splitting unit in the first communication device, the IP packet into a command portion and a data portion, encoding, by a data encoding unit in the first communication device, the data portion into a text delimited non-IP format, transmitting, by a transmitting unit in the first communication device, the encoded data portion and the command portion, receiving, by a second communication device, the encoded data portion and the command portion, decoding, by a data decoding unit in the second communication device, the encoded data portion into IP format, combining, by a constructor unit in the second communication device, the decoded data portion and the command portion to regenerate the IP packet, and receiving, by a second synchronous multi-application API running on a second computer, the regenerated IP packet.

22 Claims, 14 Drawing Sheets

(56) References Cited

U.S. PATENT DOCUMENTS

| | | | |
|---|---|---|---|
| 7,103,154 B1* | 9/2006 | Cannon | H04M 1/6505 |
| | | | 379/32.01 |
| 7,222,299 B1 | 5/2007 | Lim et al. | |
| 7,239,634 B1 | 7/2007 | Chakravorty | |
| 7,526,801 B2 | 4/2009 | Ballinger et al. | |
| 7,890,612 B2 | 2/2011 | Todd et al. | |
| 7,945,779 B2 | 5/2011 | Martin | |
| 8,155,636 B2* | 4/2012 | Cheng | H04M 1/72533 |
| | | | 455/419 |
| 8,375,327 B2* | 2/2013 | Lorch | H04M 1/72555 |
| | | | 715/810 |
| 8,396,214 B2 | 3/2013 | Helfman et al. | |
| 8,577,616 B2 | 11/2013 | Dunlap | |
| 8,732,455 B2* | 5/2014 | Wong | G06F 21/12 |
| | | | 713/154 |
| 9,189,637 B2 | 11/2015 | Mevec et al. | |
| 9,210,179 B2 | 12/2015 | Mevec et al. | |
| 9,223,991 B2 | 12/2015 | Mevec et al. | |
| 9,235,724 B2 | 1/2016 | Mevec et al. | |
| 9,680,779 B2* | 6/2017 | Marovets | H04L 51/08 |
| 9,813,343 B2* | 11/2017 | Williams | H04L 67/1023 |
| 2004/0002350 A1* | 1/2004 | Gopinath | H04W 88/184 |
| | | | 455/466 |
| 2005/0233759 A1* | 10/2005 | Anvekar | H04W 88/184 |
| | | | 455/466 |
| 2006/0123479 A1 | 6/2006 | Kumar et al. | |
| 2007/0152058 A1* | 7/2007 | Yeakley | G06F 40/14 |
| | | | 235/462.01 |
| 2007/0257982 A1* | 11/2007 | Luo | H04M 1/72533 |
| | | | 348/14.05 |
| 2007/0259657 A1* | 11/2007 | Cheng | H04M 1/72533 |
| | | | 455/419 |
| 2008/0162390 A1* | 7/2008 | Kapoor | G06F 9/505 |
| | | | 706/20 |
| 2008/0216022 A1* | 9/2008 | Lorch | H04M 1/72555 |
| | | | 715/847 |
| 2008/0229415 A1* | 9/2008 | Kapoor | H04L 63/14 |
| | | | 726/22 |
| 2008/0262990 A1* | 10/2008 | Kapoor | H04L 63/1408 |
| | | | 706/20 |
| 2008/0262991 A1* | 10/2008 | Kapoor | H04L 63/14 |
| | | | 706/20 |
| 2009/0252323 A1 | 10/2009 | Cooper | |
| 2012/0005101 A1 | 1/2012 | Chessick | |
| 2012/0017262 A1* | 1/2012 | Kapoor | H04L 63/1408 |
| | | | 726/1 |
| 2012/0042361 A1* | 2/2012 | Wong | G06F 21/55 |
| | | | 726/4 |
| 2012/0124661 A1* | 5/2012 | Lee | G06F 21/554 |
| | | | 726/13 |
| 2012/0194320 A1* | 8/2012 | Yeakley | G06F 16/81 |
| | | | 340/10.1 |
| 2012/0240185 A1* | 9/2012 | Kapoor | H04L 41/0866 |
| | | | 726/1 |
| 2013/0018945 A1* | 1/2013 | Vendrow | G06F 3/0484 |
| | | | 709/203 |
| 2013/0019096 A1 | 1/2013 | Palzer et al. | |
| 2014/0189343 A1 | 7/2014 | Heit | |
| 2014/0380038 A1 | 12/2014 | Wilson et al. | |
| 2015/0029002 A1* | 1/2015 | Yeakley | G06F 16/1744 |
| | | | 340/10.51 |
| 2015/0106458 A1* | 4/2015 | Marovets | H04L 51/066 |
| | | | 709/206 |
| 2016/0011996 A1* | 1/2016 | Asaad | G06F 12/0862 |
| | | | 710/308 |
| 2016/0366160 A1* | 12/2016 | Kapoor | H04L 63/1425 |
| 2017/0046702 A1* | 2/2017 | Mitola, III | G06F 9/524 |
| 2017/0330153 A1* | 11/2017 | Muhammedali | G06Q 10/10 |
| 2017/0339247 A1* | 11/2017 | Tiwari | H04L 41/0806 |
| 2019/0058693 A1 | 2/2019 | Alkhabbaz et al. | |
| 2019/0385057 A1* | 12/2019 | Litichever | G06N 3/08 |

OTHER PUBLICATIONS

International Search Report and Written Opinion for related PCT application PCT/US2018/046832 dated Nov. 19, 2018; pp. 1-13.
International Search Report and Written Opinion for International Application No. PCT/US2020/040745, report dated Oct. 5, 2020; pp. 1-13.

* cited by examiner

| Company:<br>Address: | | Bulk Plant #10 | | Report #:<br>Prepared by: | | | |
|---|---|---|---|---|---|---|---|
| Period Covered: | | | | Date: | | | |
| Customer Information | Gasoline<br>Price=$x1 | Diesel /<br>Kerosene<br>Price=$x2 | Ethyl<br>Alcohol<br>Price=$x3 | Jet Fuel<br>Price=$x4 | LPG<br>Price=$x5 | Other<br>Price=$x6 | Total Sale<br>($) |
| Record | | | | Authorized by: | | | |
| 1 | Name:<br>Address: | | | | | | |
| 2 | Name:<br>Address: | | | | | | |
| 3 | Name:<br>Address: | | | | | | |
| n | Name:<br>Address: | | | | | | |

FIG. 1

Dual Frequency Tone Encoding

| Hz | 1250 | 1300 | 1350 | 1400 | 1450 | 1500 | 1550 | 1600 | 1650 |
|---|---|---|---|---|---|---|---|---|---|
| 600 | 1 | 2 | 3 | 4 | 5 | 6 | 7 | 8 | 9 |
| 630 | 0 | A | B | C | D | E | F | G | H |
| 660 | I | J | K | L | M | N | O | P | Q |
| 690 | R | S | T | U | V | W | X | Y | Z |
| 720 | a | b | c | d | e | f | g | h | i |
| 750 | j | k | l | m | n | o | p | q | r |
| 780 | s | t | u | v | w | x | t | z | ! |
| 910 | @ | # | $ | % | < | & | * | ( | ) |
| 940 | [ | ] | { | } | - | = | ; | : | ? |
| 970 | / | , | . | . | ~ | _ | \ | - | + |

4-20mA Encoding

| mA | 0 | 4 | 6 | 8 | 10 | 12 | 14 | 16 | 18 | 20 |
|---|---|---|---|---|---|---|---|---|---|---|
| 4  | 9 | H | Q | Z | i | r | ! | ) | ? | + |
| 6  | 8 | G | P | Y | h | q | z | ( | : | - |
| 8  | 7 | F | O | X | g | p | t | * | ; | \ |
| 10 | 6 | E | N | W | f | o | x | & | " | = |
| 12 | 5 | D | M | V | e | n | w | < | ' | ~ |
| 14 | 4 | C | L | U | d | m | v | % | } | . |
| 16 | 3 | B | K | T | c | l | u | $ | { | ` |
| 18 | 2 | A | J | S | b | k | t | # | ] | ' |
| 20 | 1 | 0 | I | R | a | j | s | @ | [ | / | mV Encoding

| mV Encoding \ mV | 5 | 10 | 15 | 20 | 25 | 30 | 35 | 40 | 45 | 50 |
|---|---|---|---|---|---|---|---|---|---|---|
| 4 | 9 | H | Q | Z | - | r | - | ) | ? | + |
| 6 | 8 | G | P | Y | h | q | z | ( | : | - |
| 8 | 7 | F | O | X | g | p | t | * | ; | \ |
| 10 | 6 | E | N | W | f | o | x | & | " | = |
| 12 | 5 | D | M | V | e | n | w | < | ' | ~ |
| 14 | 4 | C | L | U | d | m | v | % | } | . |
| 16 | 3 | B | K | T | c | l | u | $ | { | ^ |
| 18 | 2 | A | J | S | b | k | t | # | ] | , |
| 20 | 1 | 0 | I | R | a | j | s | @ | [ | / |

Light Pulse Repetition Frequency Encoding

| LPRF | 50 | 45 | 40 | 35 | 30 | 25 | 20 | 15 | 10 |
|------|----|----|----|----|----|----|----|----|----|
| 5    | 1  | 2  | 3  | 4  | 5  | 6  | 7  | 8  | 9  |
| 10   | 0  | A  | B  | C  | D  | E  | F  | G  | H  |
| 15   | I  | J  | K  | L  | M  | N  | O  | P  | Q  |
| 20   | R  | S  | T  | U  | V  | W  | X  | Y  | Z  |
| 25   | a  | b  | c  | d  | e  | f  | g  | h  | i  |
| 30   | j  | k  | l  | m  | n  | o  | p  | q  | r  |
| 35   | s  | t  | u  | v  | w  | x  | y  | z  | !  |
| 40   | @  | #  | $  | %  | <  | &  | *  | (  | )  |
| 45   | [  | ]  | {  | }  | '  | "  | ;  | :  | ?  |
| 50   | /  | ,  | \  | .  | ~  | =  | /  | -  | +  |

Command Encoding

| I/O | Service Request |
|---|---|
| 000 | Send values for record x |
| 001 | Re-send values for record x |
| 010 | Received values for record x acknowledged |
| 100 | Send values for report x |
| 110 | Send values for report y |
| 011 | Re-send values for report x |
| 101 | Received values for report x acknowledged |
| 111 | Stand by |

FIG. 10

SYSTEMS AND METHODS FOR SECURELY TRANSFERRING SELECTIVE DATASETS BETWEEN TERMINALS WITH MULTI-APPLICATIONS SUPPORT

CROSS-REFERENCE TO RELATED PATENT APPLICATIONS

This application is a Continuation-In-Part of and claims priority from U.S. patent application Ser. No. 15/679,669, filed Aug. 17, 2017, titled "SYSTEMS AND METHODS FOR SECURELY TRANSFERRING SELECTIVE DATASETS BETWEEN TERMINALS," the entire contents of which is incorporated herein by reference.

TECHNICAL FIELD

Embodiments of the invention relate to securely transferring selective datasets between terminals and, more specifically, to methods, systems, and non-transitory computer-readable medium having computer program stored therein to securely transfer selective datasets between terminals connected over a computer network.

BACKGROUND

In the oil and gas industry, a Terminal Management System (TMS) is an automated solution that is used to facilitate, monitor, and control the distribution of products and manage critical processes in a bulk terminal to ensure optimum and safe operation of a bulk plant terminal. TMS may be divided into two areas including automation, which provides management of tank farm automation, product movement, driver access, and inventory control. The system also controls loading racks and associated equipment, pumps, valves, motors, weigh scales, meters, card readers, data entry terminals equipment. The second area is sales ticketing. In addition to bulk plant automation functionality, the system also allows for data exchange between TMS automation system and corporate data systems using a separate corporate computer communicating over standard TCP/IP in order to perform corporate level functions including billing interfaces, reports, and measurement units, etc.

When bulk plants communicate with a corporate network over standard TCP/IP connection for sales and billing transactions, there is always the possibility of hacking or malware spreading between the two networks even with use of sophisticated firewalls and other security systems. Current TCP/IP connection between the bulk plants TMS system and corporate billing module is therefore susceptible to potential hacking and/or spreading of various types of malware or viruses or cybersecurity attacks. Because the corporate billing system only requires text based parameters to complete the sales transaction and issue a bill of sale, a full TCP/IP communication session that could potentially hinder system security may no longer be required.

SUMMARY

Accordingly, embodiments of the invention herein describe systems and methods that may eliminate the TCP/IP session and utilize a selective dataset transfer encoded in text format, thus meeting both application and network security requirements.

Accordingly, one example embodiment is a method for securely transmitting selective datasets between terminals connected via a computer network. The method functions by first intercepting the network connection and effectively breaking the TCP/IP session, thus creating a communication "gap" to prevent any illegitimate data transfer. The method creates the "gap" as it receives, by a first communication device, an internet protocol (IP) packet via a first synchronous multi-application programming interface (API) running on a first computer, dividing, by a splitting unit in the first communication device, the IP packet into a command portion and a data portion, encoding, by a data encoding unit in the first communication device, the data portion into a text delimited non-IP format, and transmitting, by a transmitting unit in the first communication device, the encoded data portion and the command portion. The method also includes receiving, by a second communication device, the encoded data portion and the command portion, decoding, by a data decoding unit in the second communication device, the encoded data portion into IP format, combining, by a constructor unit in the second communication device, the decoded data portion and the command portion to regenerate the IP packet, and receiving, by a second synchronous multi-application API running on a second computer, the regenerated IP packet. The method also includes receiving, by the second communication device, a second IP packet via the second synchronous multi-application API running on the second computer, dividing, by a splitting unit in the second communication device, the second IP packet into a command portion and a data portion, determining, by one or more processors in the second communication device, if the command portion is whitelisted, encoding, by a command encoding unit in the second communication device, the command portion into a non-IP format if the command portion is whitelisted, and transmitting, by a transmitting unit in the second communication device, the encoded command portion and the data portion. The method also includes receiving, by the first communication device, the encoded command portion and the data portion, decoding, by a command decoding unit in the first communication device, the encoded command portion into IP format, combining, by a constructor unit in the first communication device, the decoded command portion and the data portion to regenerate the second IP packet, and receiving, by the first synchronous multi-application API running on the first computer, the regenerated second IP packet. The data portion may include at least one of a customer name, customer address, fuel type, fuel price, and fuel quantity in text format only. The command portion may include at least one of a source address, destination address, and checksum, for data integrity. The encoding of the command portion may include 3-bit encoding of the command portion using out of bound digital command circuitry. The encoding of the data portion may be selected from the group consisting of dual frequency tone encoding, 4-20 mA encoding, millivolt encoding, and light pulse repetition frequency encoding.

Another example embodiment is a system for securely transmitting selective data between terminals including a packet stripping, transmission morphing and packet restructuring functions to only allow text contents transfer between terminals regardless of the original data type and format, thus any other embedded formatted components will be dropped.

Another example embodiment is a system for securely transmitting selective datasets between terminals connected via a computer network. The system includes a first communication device connected to a first computer on the network, the first communication device comprising a first splitting unit, a first text encoding and decoding unit, a first command encoding and decoding unit, a first constructor unit, and a first transceiver for sending and receiving IP packets over the network, and a second communication device connected to a second computer on the network, the second communication device comprising a second splitting unit, a second text encoding and decoding unit, a second command encoding and decoding unit, a second constructor unit, and a second transceiver for sending and receiving IP packets over the network, wherein the first communication device is configured to receive an internet protocol (IP) packet via a first synchronous multi-application programming interface (API) running on the first computer, divide the IP packet into a command portion and a data portion using the first splitting unit, encode the data portion into a text delimited non-IP format using the first data encoding unit, and transmit the encoded text portion and the command portion using the first transceiver. The second communication device may be configured to receive the encoded text portion and the command portion, decode the encoded text portion into IP format using the second decoding unit, combine the decoded text portion and the command portion to regenerate the IP packet using the second constructor unit, and transmit the regenerated IP packet to a second synchronous multi-application API running on the second computer. The second communication device may further configured to receive a second IP packet via the second synchronous multi-application API running on the second computer, divide the second IP packet into a command portion and a data portion using the second splitting unit, determine, using one or more processors in the second communication device, if the command portion is whitelisted, encode the command portion into a non-IP format using the second command encoding unit, and transmit the encoded command portion and the data portion using the second transceiver. The first communication device may be further configured to receive the encoded command portion and the data portion, decode the encoded command portion into IP format using the first decoding unit, combine the decoded command portion and the data portion to regenerate the second IP packet using the first constructor unit, and transmit the regenerated second IP packet to the first synchronous multi-application API running on the first computer. The data portion may include at least one of a customer name, customer address, fuel type, fuel price, and fuel quantity. The command portion may include at least one of a source address, destination address, and checksum, for data integrity. Encoding the command portion may include 3-bit encoding of the command portion using out of bound digital command circuitry. Encoding the data portion may be selected from the group consisting of dual frequency tone encoding, 4-20 mA encoding, millivolt encoding, and light pulse repetition frequency encoding.

Another example embodiment is a non-transitory computer-readable medium including instructions stored thereon, which when executed by one or more processors operatively coupled to the computer-readable medium, cause the one or more processors to perform operations including receiving an internet protocol (IP) packet via a first synchronous multi-application programming interface (API) running on a first computer, dividing the IP packet into a command portion and a data portion, encoding the data portion into a text delimited non-IP format, and transmitting the encoded data portion and the command portion. The instructions may further cause the one or more processors to perform operations including receiving an encoded command portion and a data portion, decoding the encoded command portion into IP format, combining the decoded command portion and the data portion to regenerate a second IP packet, and transmitting the regenerated second IP packet.

Another example embodiment is a non-transitory computer-readable medium including instructions stored thereon, which when executed by one or more processors operatively coupled to the computer-readable medium, cause the one or more processors to perform operations including receiving an encoded data portion and a command portion, decoding the encoded data portion into IP format, combining the decoded data portion and the command portion to regenerate an IP packet, and transmitting the regenerated IP packet. The instructions may further cause the one or more processors to perform operations including receiving a second IP packet via a second synchronous multi-application API running on a second computer, dividing the second IP packet into a command portion and a data portion, determining if the command portion is whitelisted, encoding the command portion into a non-IP format if the command portion is whitelisted, and transmitting the encoded command portion and the data portion.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

FIG. 1 illustrates an example sales record that may be transferred between a TMS terminal and a corporate billing module, according to one or more example embodiments of the disclosure.

FIGS. 6-9 illustrate example data encoding and decoding methodologies that may be used in a system, according to one or more example embodiments of the disclosure.

FIG. 10 illustrates example command encoding and decoding methodologies that may be used in a system, according to one or more example embodiments of the disclosure.

DETAILED DESCRIPTION

Figure 2:
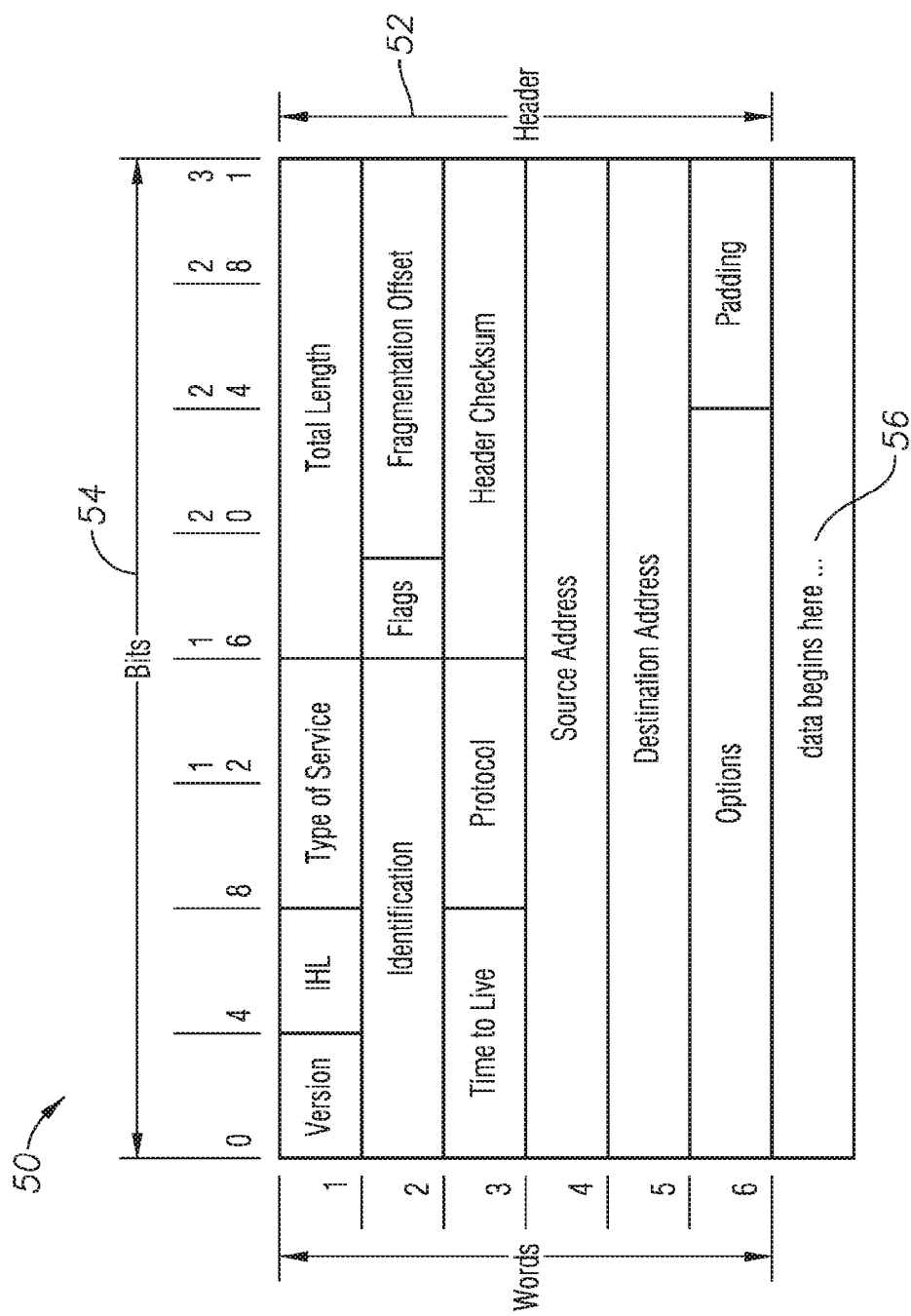
FIG. 2 illustrates a typical TCP/IP packet that carries a sales record from the TMS to the corporate billing module, according to one or more example embodiments of the disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

One embodiment of the invention is a method and apparatus to facilitate secure upload of a bulk plant's sales records information onto a corporation's billing system. The method is based on breaking a TCP/IP session between a bulk plant Terminal Management System (TMS) and corporate sales computer, thereby creating a "gap" in TCP/IP session between the bulk plant TMS and corporate business sales module, extracting the data field and eventually transmitting the sales data in "text" delimited format by use of IP-text encoding/decoding methodologies. The method works by encoding the sales figures as part of the data field of a TCP/IP packet originating from the bulk plant ticketing system into a text format, and then uploading it onto enterprise sales module after decoding it back to TCP/IP packet format, thus eliminating the potential hacking and spread of malware and viruses between the bulk plant and corporate sales systems.

Since the TMS business sale transactions are made up of fixed reports and record structures comprising basic field information such as customer's name, customer's address, transaction date, fuel type, fuel price, amount of fuel, etc., the anticipated size of transmitted data is very limited. Additionally, due to their fixed (static) structure, data records formats are not required to be copied over as they never change. The only "dynamic" element that needs to be copied over is "data" within these records, for which it can easily be represented in standard character set. The present system converts TMS sales figures transmitted as part of the data field of the IP packet to the sales module on the corporate side, and only after receiving a legitimate request from corporate side. As a result throughout the data transmission between the two networks, there is "zero" TCP/IP handshaking.

Therefore, the solution presented in the present invention disclosure mitigates or eliminates the risk of potential hacking or spreading of malware or viruses or cybersecurity attacks by sending a request for sales data targeted to the TMS sales server, intercepting the service request sent by the corporate billing module, stripping the payload of the sent IP packet into "command" and "data" parts, wherein the "command" part is mapped to only seven (7) potential command values, and only the accepted application requests are encoded into a 3-bit digital format and transmitted between the two paired encoder/decoder apparatus via an "out of bound" non-IP circuitry. The command circuitry is isolated in hardware from the data encoding/decoding circuitry to ensure optimum security of the apparatus.

Turning now to the figures, FIG. 1 illustrates an example sales record 10 that may be transferred between a TMS terminal and a corporate billing module. The sales record may include information such as the bulk plant 12 where it was generated, a report number 14 and a record number 16. The sales record 10 may also include the seller's name 18, seller's address 20, the period covered 22 by the sales record 10, the date 24 on which the sales record was generated, date on which the fuel was delivered, the preparer's name 26, the authorized signatory 28, name of the buyer 30, and physical address of the buyer 32. The sales record 10 may also include details of the sale or transaction, such as the type of fuel, price of the fuel type, quantity of fuel, and the total sale amount. The type of fuel may include gasoline, diesel, kerosene, ethyl alcohol, jet fuel, liquefied petroleum gas, or any other fuel type. These TMS sales and purchase records and invoices are normally transmitted to the corporate business module via Transmission Control Protocol/Internet Protocol (TCP/IP) network connection including information such as those described above. The record format is "static", and thus it may not be involved in the replication process. The "data" is the only dynamic element that requires copying over to the corporate network composed entirely in "character" format that can easily be represented in typical keyboard.

FIG. 2 illustrates a typical TCP/IP packet 50 that carries sales record 10 from the TMS to the corporate billing module. A typical IP packet 50 may include a header portion 52 and a data portion 56. In one example embodiment, the IP packet 50 encapsulates the data unit or payload 56 received from upper Open Systems Interconnection (OSI) layers, such as the transport layer (layer 4), for example, and add to their own header information 52. Essentially, the payload 56 in this instance would be the data that is carried on behalf of the TMS sales application comprising application specific requests and associated data such as customer's names, customer's address, fuel type, fuel price, fuel quantity, etc. The IP header 52 on the other hand contains all the necessary information to ensure packet delivery including, source address, destination address, and checksums for data integrity. Each IP packet 50 may include 32 bits of information 54, which may also include the version, internet header length (IHL), type of service, total length, identification, flags, fragmentation offset, time to live, protocol, padding, and other options.

In one example embodiment, a special application layer "plugin" may be enabled so that data form IP packet payload 56 can be extracted and re-constructed as needed. The extracted data may be fed to an "encoding" engine and the re-constructed data may be fed to a "decoding" engine respectively. Additionally, this is also required to isolate the application specific requests (command) and encoding them on a hardware-based segregated channel within the apparatus to ensure optimum security.

Figure 3:
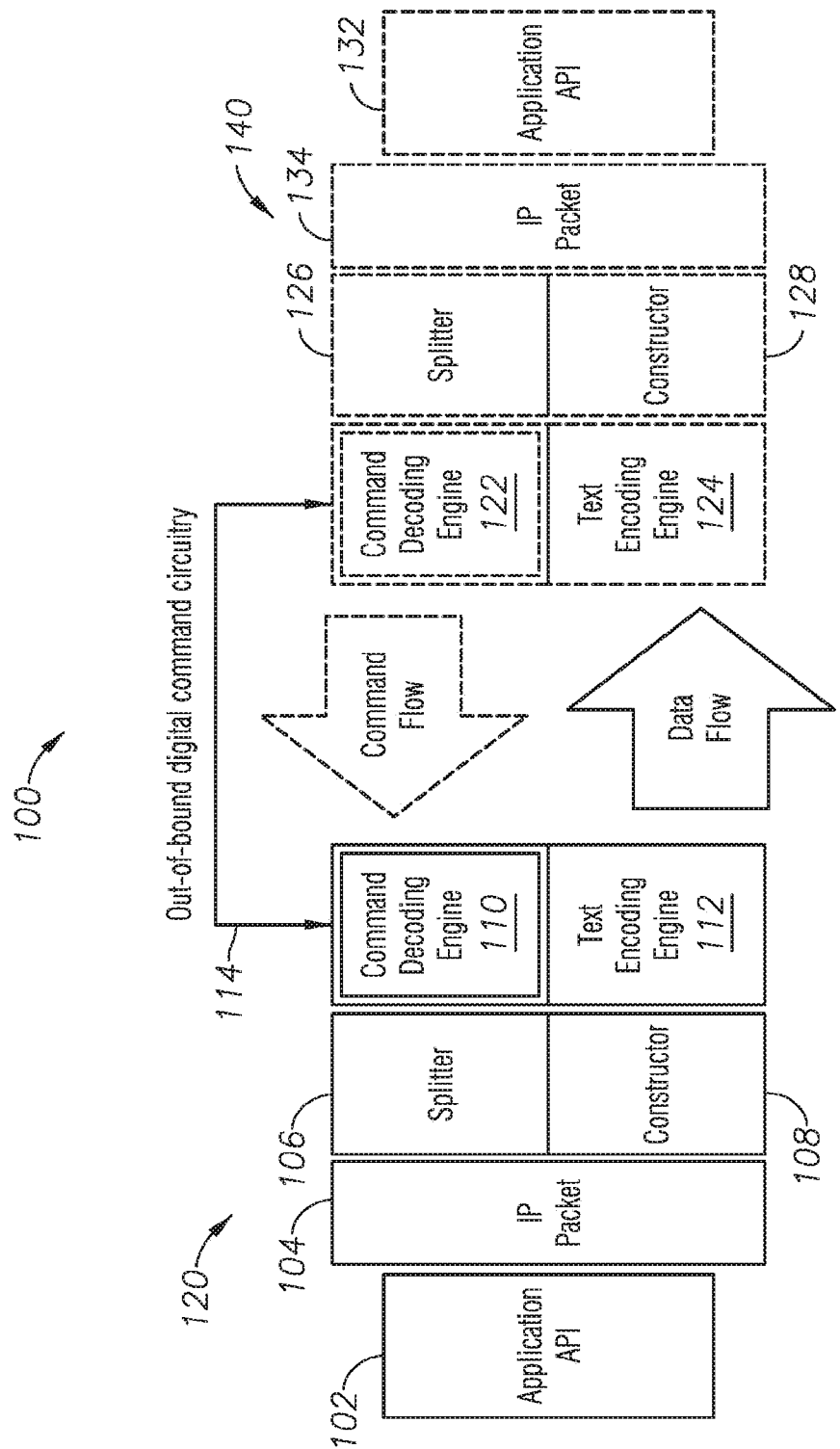
FIG. 3 illustrates on a high level components of a system for securely transmitting data between terminals connected via a computer network, according to one or more example embodiments of the disclosure.

FIG. 3 illustrates on a high level components of a system 100 for securely transmitting selective datasets between terminals connected via a computer network, according to one or more example embodiments. The system 100 includes a first communication device 120 connected to a first computer, for example a sale module, on the network. The first communication device 120 may include a first splitting unit 106, a first text encoding and decoding unit 112, a first command encoding and decoding unit 110, a first constructor unit 108, and a first transceiver (not shown) for sending and receiving IP packets over the network. The system 100 may also include a second communication device 140 connected to a second computer, for example a billing module, on the network. The second communication device 140 may include a second splitting unit 126, a second text encoding and decoding unit 124, a second command encoding and decoding unit 122, a second constructor unit 128, and a second transceiver (not shown) for sending and receiving IP packets over the network. The first communication device 120 may be configured to receive an internet protocol (IP) packet 104 via a first application programming interface (API) 102 running on the first computer, divide the IP packet 104 into a command portion and a data portion using the first splitting unit 106, encode the data portion into a text delimited non-IP format using the first data encoding unit 112, and transmit the encoded data portion and the command portion using the first transceiver. Although some embodiments refer to "data encoding" and "data decoding," it should be noted that "data" may include any form of data, including but not limited to "text."

The second communication device 140 may be configured to receive the encoded data portion and the command portion, decode the encoded data portion into IP format using the second decoding unit 124, combine the decoded data portion and the command portion to regenerate the IP packet using the second constructor unit 128, and transmit the regenerated IP packet 134 to a second API 132 running on the second computer. The second communication device may further configured to receive a second IP packet 134 via the second API 132 running on the second computer, divide the second IP packet into a command portion and a data portion using the second splitting unit 126, determine, using one or more processors in the second communication device 140, if the command portion is whitelisted, encode the command portion into a non-IP format using the second command encoding unit 122, and transmit the encoded command portion and the data portion using the second transceiver. The first communication device 120 may then receive the encoded command portion and the data portion, decode the encoded command portion into IP format using the first decoding unit 110, combine the decoded command portion and the data portion to regenerate the second IP packet using the first constructor unit 108, and transmit the regenerated second IP packet 104 to the first API 102 running on the first computer. The data portion may include at least one of a customer name, customer address, fuel type, fuel price, and fuel quantity. The command portion may include at least one of a source address, destination address, and checksum, for data integrity. Encoding the command portion may include 3-bit encoding of the command portion using out of bound digital command circuitry 114, for example.

Figure 4:
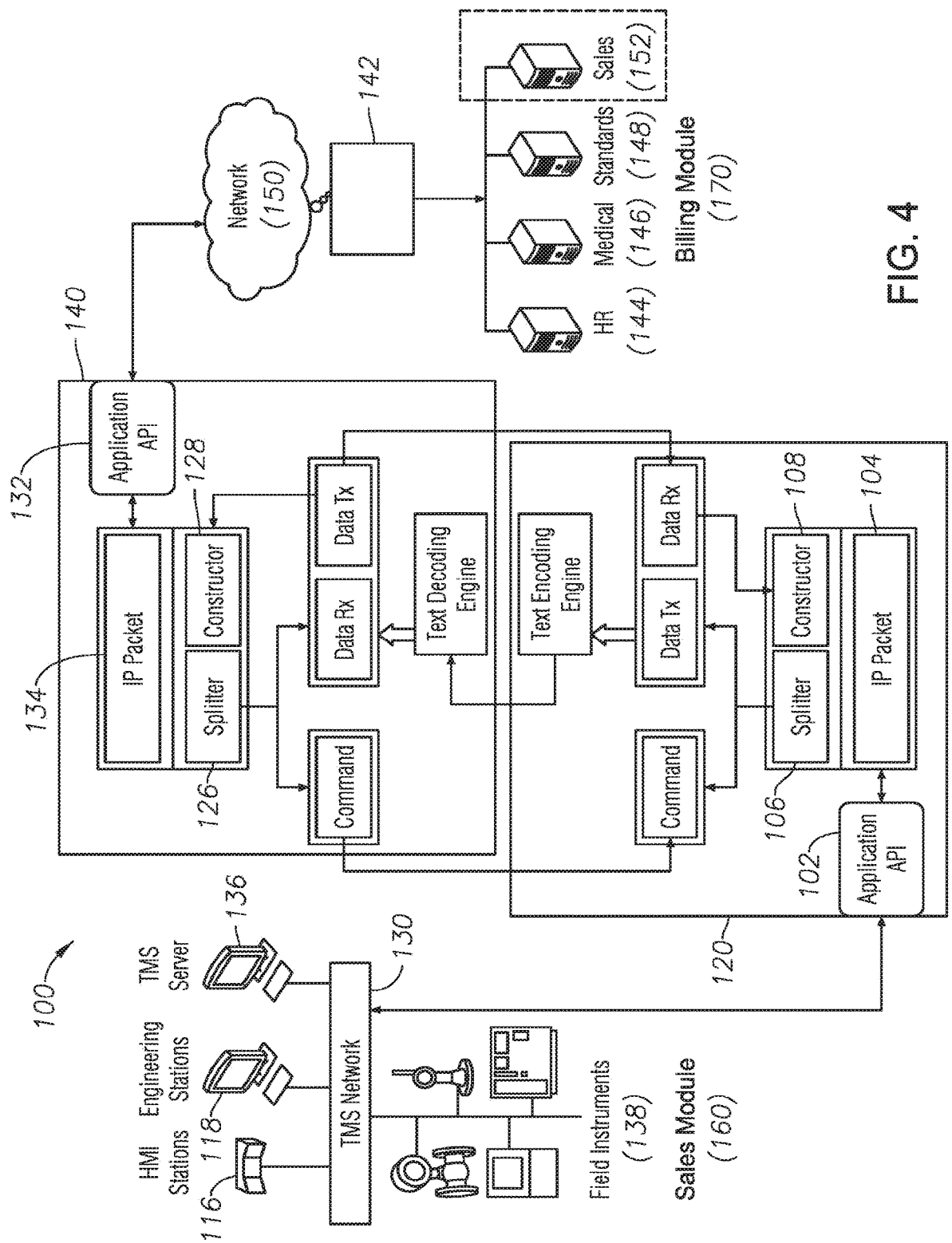
FIG. 4 illustrates architecture of system for securely transmitting data between terminals connected via a computer network, which includes a sales module and a billing module, according to one or more example embodiments of the disclosure.

FIG. 4 illustrates architecture of system 100 in further detail, which includes a sales module 160 and a billing module 170, according to one or more example embodiments. The sales module 160 may include one or more computers, such as TMS servers 136, engineering stations 118, and human machine interface (HMI) stations 116, which may be connected via TMS network 130, for example. The sales module 160 may also include field instruments that may be connected to the TMS network 130. The billing module 170 may include one or more computers, such as HR server 144, medical records server 146, standards server 148, and sales server 152, which may be connected to a network 150 via an interface 142, such as SAP or any enterprise software that can manage business operations and customer relations. Networks 130, 150 may include any computer network including but not limited to LAN, WAN, DSL network, and wireless networks such as Wi-Fi, 3G, 4G, and 4G LTE.

The system 100 includes a first communication device 120 connected to a first computer, for example a sale module, on the network. The first communication device 120 may include a first splitting unit 106, a first text encoding and decoding unit 112, a first command encoding and decoding unit 110, a first constructor unit 108, and a first transceiver (not shown) for sending and receiving IP packets over the network. The system 100 may also include a second communication device 140 connected to a second computer, for example a billing module, on the network. The second communication device 140 may include a second splitting unit 126, a second text encoding and decoding unit 124, a second command encoding and decoding unit 122, a second constructor unit 128, and a second transceiver (not shown) for sending and receiving IP packets over the network. The first communication device 120 may be configured to receive an internet protocol (IP) packet 104 via a first application programming interface (API) 102 running on the first computer, divide the IP packet 104 into a command portion and a data portion using the first splitting unit 106, encode the data portion into a text delimited non-IP format using the first text encoding unit 112, and transmit the encoded data portion and the command portion using the first transceiver.

The second communication device 140 may be configured to receive the encoded data portion and the command portion, decode the encoded data portion into IP format using the second decoding unit 124, combine the decoded data portion and the command portion to regenerate the IP packet using the second constructor unit 128, and transmit the regenerated IP packet 134 to a second API 132 running on the second computer. The second communication device may further configured to receive a second IP packet 134 via the second API 132 running on the second computer, divide the second IP packet into a command portion and a data portion using the second splitting unit 126, determine, using one or more processors in the second communication device 140, if the command portion is whitelisted, encode the command portion into a non-IP format using the second command encoding unit 122, and transmit the encoded command portion and the data portion using the second transceiver. The first communication device 120 may then receive the encoded command portion and the data portion, decode the encoded command portion into IP format using the first decoding unit 110, combine the decoded command portion and the data portion to regenerate the second IP packet using the first constructor unit 108, and transmit the regenerated second IP packet 104 to the first API 102 running on the first computer. The data portion may include at least one of a customer name, customer address, fuel type, fuel price, and fuel quantity. The command portion may include at least one of a source address, destination address, and checksum, for data integrity.

Figure 5:
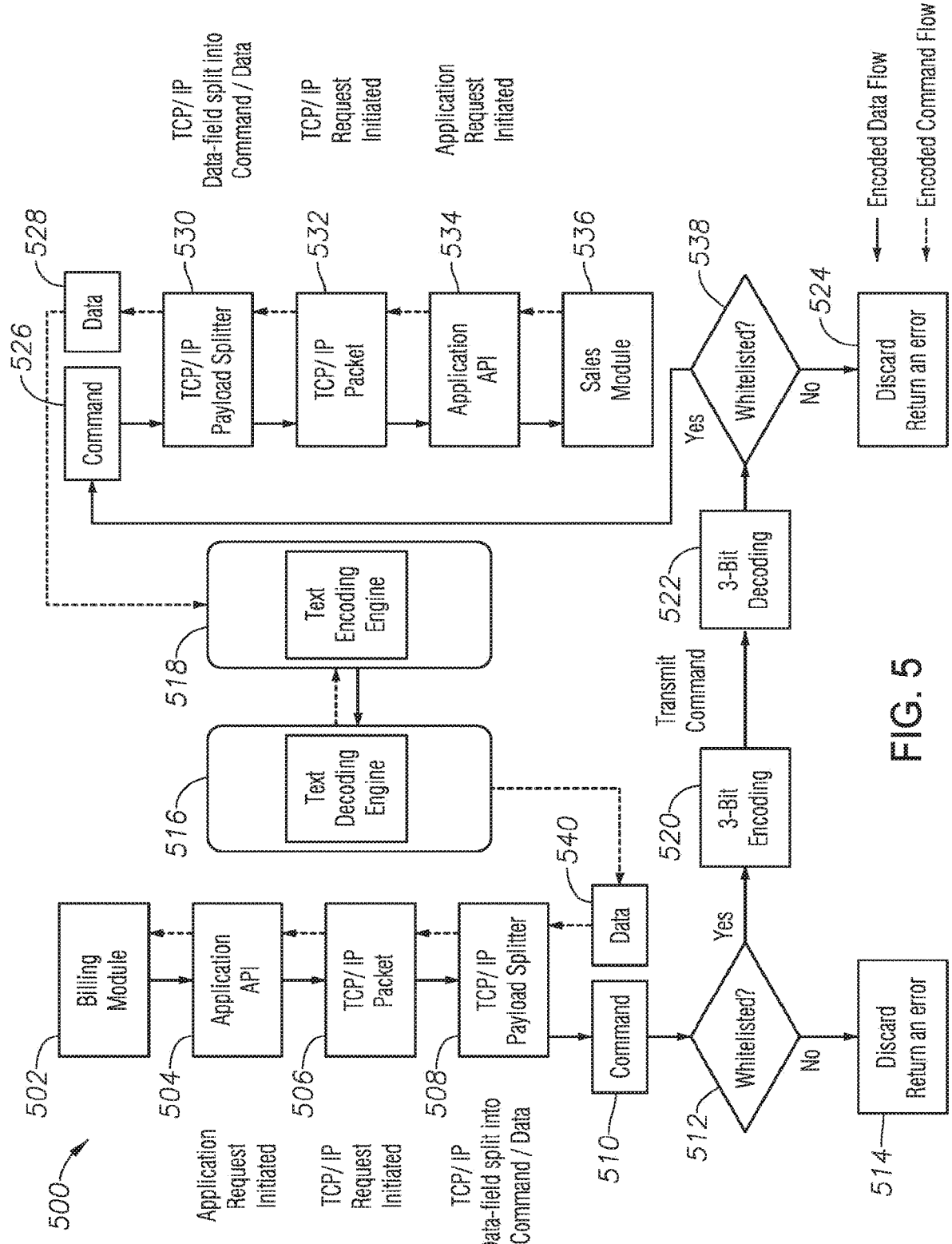
FIG. 5 illustrates a logic diagram for a method for securely transmitting data between terminals connected via a computer network, according to one or more example embodiments of the disclosure.

FIG. 5 illustrates a logic diagram for a method 500 for securely transmitting selective datasets between terminals connected via a computer network. The method 500 includes receiving, by a first communication device, an internet protocol (IP) packet 532 via a first application programming interface (API) 534 running on a first computer, such as a sales module 536. The method 500 further includes dividing, by a splitting unit 530 in the first communication device, the IP packet into a command portion 526 and a data portion 528. The method 500 may also include encoding, by a data encoding unit 518 in the first communication device, the data portion into a text delimited non-IP format, and transmitting, by a transmitting unit (not shown) in the first communication device, the encoded data portion and the command portion. The method 500 may also include receiving, by a second communication device, such as the billing module 502, the encoded data portion and the command portion, and decoding, by a data decoding unit 516 in the second communication device, the encoded data portion 540 into IP format. The method 500 also includes combining, by a constructor unit 508 in the second communication device, the decoded data portion 540 and the command portion 510 to regenerate the IP packet 506, and receiving, by a second API 504 running on the second computer 502, the regenerated IP packet.

The method 500 may also include receiving, by the second communication device 502, a second IP packet 506 via the second API 504 running on the second computer, dividing, by a splitting unit 508 in the second communication device, the second IP packet 506 into a command portion 510 and a data portion 540. The method also includes determining at step 512, by one or more processors in the second communication device, if the command portion 510 is whitelisted, and encoding at step 520, by a command encoding unit in the second communication device, the command portion 510 into a non-IP format if the command portion is whitelisted, and transmitting at step 538, by a transmitting unit in the second communication device, the encoded command portion 526 and the data portion 528. In the event the command portion is not whitelisted, then the method returns an error message at steps 514 and 524, respectively. The method 500 may also include receiving, by the first communication device, the encoded command portion 526 and the data portion 528, decoding, by a command decoding unit 522 in the first communication device, the encoded command portion into IP format, combining, by a constructor unit 530 in the first communication device, the decoded command portion and the data portion to regenerate the second IP packet 532, and receiving, by the first API 534 running on the first computer, the regenerated second IP packet. The data portion 528, 540 may include at least one of a customer name, customer address, fuel type, fuel price, and fuel quantity. The command portion 510, 526 may include at least one of a source address, destination address, and checksum, for data integrity. The encoding of the command portion may include 3-bit encoding 520 of the command portion using out of bound digital command circuitry, for example.

In addition, it should be appreciated that the operations described and depicted in FIG. 5 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIG. 5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers), data storage (e.g., file management) routines, other common routines and services, etc.), or third-party software components (e.g., middleware, encryption or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

The following paragraphs describe example TMS data encoding and decoding methodologies that may be used in system 100 illustrated in FIG. 3 and FIG. 4, for example. The idea of the encoding is to transfer the TMS sales data using a non-IP transport mechanism, thus preventing potential hacking, penetration and spread of viruses and malware. The encoded data may include only data within the sales record as so extracted by the data-command stripper plugin. One example method of encoding is dual frequency tone encoding, as illustrated in FIG. 6, for example. The dual frequency encoding character set can be laid out in a 9×10 matrix of character combinations in which each row represents the low frequency component and each column represents the high frequency component of the dual frequency tone encoding signal. The encoding engine may send a combination of the row and column frequencies representing the intended character. For example, key 1 may produce a superimposition of tones of 600 and 1250 hertz (Hz). The transmission of the record information may only commence once a legitimate service request is received from the sales module computer on the corporate side indicating the required "record number", or "report number". Another example method of encoding is 4-20 mA encoding, as illustrated in FIG. 7, for example. The 4-20 mA encoding character set is laid out in a 9×10 matrix of character combinations in which ac current values in the range of 4-20 mA in each row and column representing the intended component of the encoding signal. The encoding engine may send a combination of the row and column mA values representing the intended character with a possibility of zero current as a legitimate value. For example, key 1 may produce two instances of 0 and 20 mA current separated by a given time delimiter. The transmission of the record information may only commence once a legitimate service request is received from the sales module computer on the corporate side indicating the required "record number", or "report number".

Another example method of encoding is millivolt (mV) encoding, as illustrated in FIG. 8, for example. The mV encoding character set is laid out in a 9×10 matrix of character combinations in which ac volt values in each row and column representing the intended component of the encoding signal. The encoding engine may send a combination of the row and column mV values representing the intended character. For example, key 1 may produce two instances of 5 and 20 mV current separated by a given time delimiter. The transmission of the record information may only commence once a legitimate service request is received from the sales module computer on the corporate side indicating the required "record number", or "report number". Another example method of encoding is Light Pulse Repetition Frequency (LPRF) encoding, as illustrated in FIG. 9, for example. LPRF is the number of pulses of a repeating light signal (laser or non-laser) in a specific time unit, normally measured in pulses per millisecond. The signal of a particular carrier frequency is turned on and off in a repeated sequence measured in terms of cycle per second, or hertz. A related measure is the pulse width, which is the amount of time the transmitter is turned on during each pulse. The LPRF encoding character set is laid out in a 9×10 matrix of character combinations in which each row represents the descending frequency component and each column represents the ascending frequency component of the (LPRF) encoding signal. The encoding engine will send a combination of the row and column light pulsations representing the intended character. For example, key 1 may produce pulsations of 5 and 50 hertz (Hz) separated by a given time delimiter. The transmission of the record information may only commence once a legitimate service request is received from the sales module computer on the corporate side indicating the required "record number", or "report number".

According to one example embodiment, the system 100 may be composed of two parts, one connected to the TMS side, for example first communication device 120, and another connected to the corporate network side, for example second communication device 140, using TCP/IP or any other protocol. The operational flow of traffic is initiated from the corporate side, for example the billing module, by sending a request for sales data targeted to the TMS sales server. This is facilitated by command flow being always unidirectional originating from the corporate side. Device 140 may intercept the service request sent by the corporate billing module as it may assume the identity of the TMS server. Device 140 may then strip the payload of the sent IP packet and split into "command" and "data" parts. The "command" part may be mapped to only seven (7) potential command values. The following are the "only" accepted application requests encoded into 3-bit digital format and transmitted between the two paired encoder/decoder apparatus via an "out of bound" non-IP circuitry. The command circuitry may be isolated in hardware from the data encoding/decoding circuitry to ensure optimum security of the apparatus.

FIG. 10, for example, illustrates a 7-command structure that may be used in the above example embodiments. It should be noted, however, that the structure depicted herein is only a sample, and could be extended to cover more database commands as required based on 4-bit encoding or higher. In this example, "send values for record x" may be used to send the data for this particular record number in the TMS Sales record. "Re-send values for record x" may be used to re-send the data for this particular record number in the TMS sales record and may be used to guard for transmission errors. "Received values for record x acknowledged" may be used to acknowledge the receipt of the requested data. "Send values for report x" may be used to send the data for entire TMS Sales report. "Re-send values for report x" may be used to re-send the data for entire TMS Sales report indicated by this number to guard for transmission errors. "Received values for report x acknowledged" may be used to acknowledge the receipt of the requested data. "Stand by" may be used to stand by for further instructions, where "x" represents the record (field) number, and "y" represents the number of the report, according to one example embodiment. This is to ensure that the command structure is "whitelisted" for pre-defined operations implemented directly in "hardware", so it cannot be altered or modified by any external means like hackers or malware. The command whitelisting and encoding in separate channel is also essential to preserve data integrity by preventing potential "spillovers" and data contamination.

Once the command is received and encoded by device 140, it may double check its integrity by verifying its legitimacy prior to transmitting it to its counterpart device 120. Once device 120 receives the encoded command, it may first verify its legitimacy prior to acting upon it. If valid, device 120 may submit an application request to obtain data from TMS sales server where it may be extracted from IP packets and accordingly encoded by one of the four methods described in earlier sections.

Another aspect of the invention is to allow for manual TMS billing data entry where whitelisted commands can be displayed over a display screen on the TMS side, and the requested data may be transmitted back in "text" mode using a keypad and/or voice dictation/recognition apparatus. The display screen and the keypad/voice recognition apparatus may be connected to the first communication device 120 in the TMS module via a USB or serial connection, for example.

Another aspect of this invention is how the system 100 may be architected. The system architecture can be implemented in four (4) different modes, for example, Point-to-Point, Point-to-Multipoint, Multipoint-to-Point, and Multipoint-to-Multipoint. The Point-to-Point system architecture allows for "one" TMS system to "one" corporate billing module. This architecture is the simplest of all and can usually be implemented in a small scale business. The Point-to-Multipoint system architecture allows for "one" TMS system to "multiple" corporate business or automation modules. This architecture is useful when TMS data is required by multiple applications such as corporate billing, capacity planning, and product movements. The Multipoint-to-Point system architecture allows for the consolidation of "multiple" TMS systems to "one" corporate billing module. This architecture is very common and can usually be implemented in large scale businesses with polarity of geographically scattered bulk plants. The Multipoint-to-Multipoint system architecture allows for the propagation of "multiple" TMS systems information to "multiple" corporate business or automation modules. This architecture is useful when TMS data is required from multiple sites and by multiple applications such as corporate billing, capacity planning, and product movements. This architecture is very common and can usually be implemented in large scale businesses with polarity of geographically scattered bulk plants.

System 100 may implement a number of self-protection mechanisms among which is hardware based whitelisting. As part of this self-protecting measure, each hardware component i.e. CPU, memory, network interfaces may be assigned a hardware digital ID by which any communication in or out of the component must be signed with and verified against. The measure may protect the system against any intervention or manipulation with hardware components.

Software whitelisting is another aspect of self-protecting measures that may be implemented by the present system. Software whitelisting ensures that each software component i.e. Operating System (OS), Applications plugins, network drivers etc. are digitally identified and verified. The measure protects the system against any intervention or manipulation with software components. Another aspect of self-protecting measures is a built-in methodology to protect against device tampering by installing a protective "seal" on the box. The seal is electronically guided and operated so that if broken (when opening the box), a flag (electronic) is sent to the "Hardware Whitelisting" subroutine. The seal logic and mechanism may be powered by an internal battery to ensue continuous operations even if the device is unplugged from wall power.

Another aspect of self-protecting measures is a built-in anomaly-based intrusion detection system. The system is designed to detect system intrusions by monitoring system activity and categorizing it as either normal or abnormal. The system employs a neural network that learns and stores patterns of acceptable system behavior so that the system will proactively cut the traffic upon the detection of suspicious behavior.

Another aspect of self-protecting measures is a built-in on/off switch that controls enabling/disabling remote access and configuration of the device using SSH and HTTPS. This is an added measure to provide protection for the device once it has been fully configured. In "Off" position, the device will not accept any network based request for management. Another aspect of enhancing system's availability and reliability is its dual bus architecture. The dual bus architecture encompasses dual CPU, dual memory etc. in reality having two devices working as one with built in-synchronizing circuitry.

Another aspect of enhancing system's efficiency is its ability for data buffering and compression. The systems also encompasses a self-restoration subroutine so that in the event configuration is lost or damaged, it can easily be restored from a backup point on a "flash" memory or from a network storage location. The system can additionally operate as per a pre-configured schedule coherent with TMS and corporate billing working schedule. This is to optimize the communication link usage and also to enhance cyber-security as the system will be mostly off during a 24-hour period.

In some embodiments, the communication devices 120, 140 can be stand alone or integrated as part of router, switch as an add-on interface. Another aspect of system's ability to adhere to adverse weather conditions are listed as follows: (a) weather proof and vandal proof housing shall be provided for installation in outdoors or in relatively hostile environment, (b) sturdy mounting is provided for outdoors installation to avoid potential vibration, (c) system mount is designed to support the maximum weight of system and enclosure assemblies, and (d) stainless steel NEMA Type 4× or IEC 60529 Type IP66 enclosures/housing are supported for systems' protection in severe corrosive environments.

In all of the above example embodiment, an Application Programming Interface (API) may be defined as a set of subroutine definitions, protocols, and tools for building an application software. In general terms, it is a set of clearly defined methods of communication between various software components. An API makes it easier to develop a computer program by providing all the building blocks, which may be then put together by the programmer. An API may be for a web-based system, operating system, database system, and computer hardware or software library. An API specification can take many forms, but often includes specifications for routines, data structures, object classes, variables or remote calls. POSIX, Microsoft Windows API, the C++ Standard Template Library and Java APIs are examples of different forms of APIs.

Illustrative Device Architecture

Figure 11:
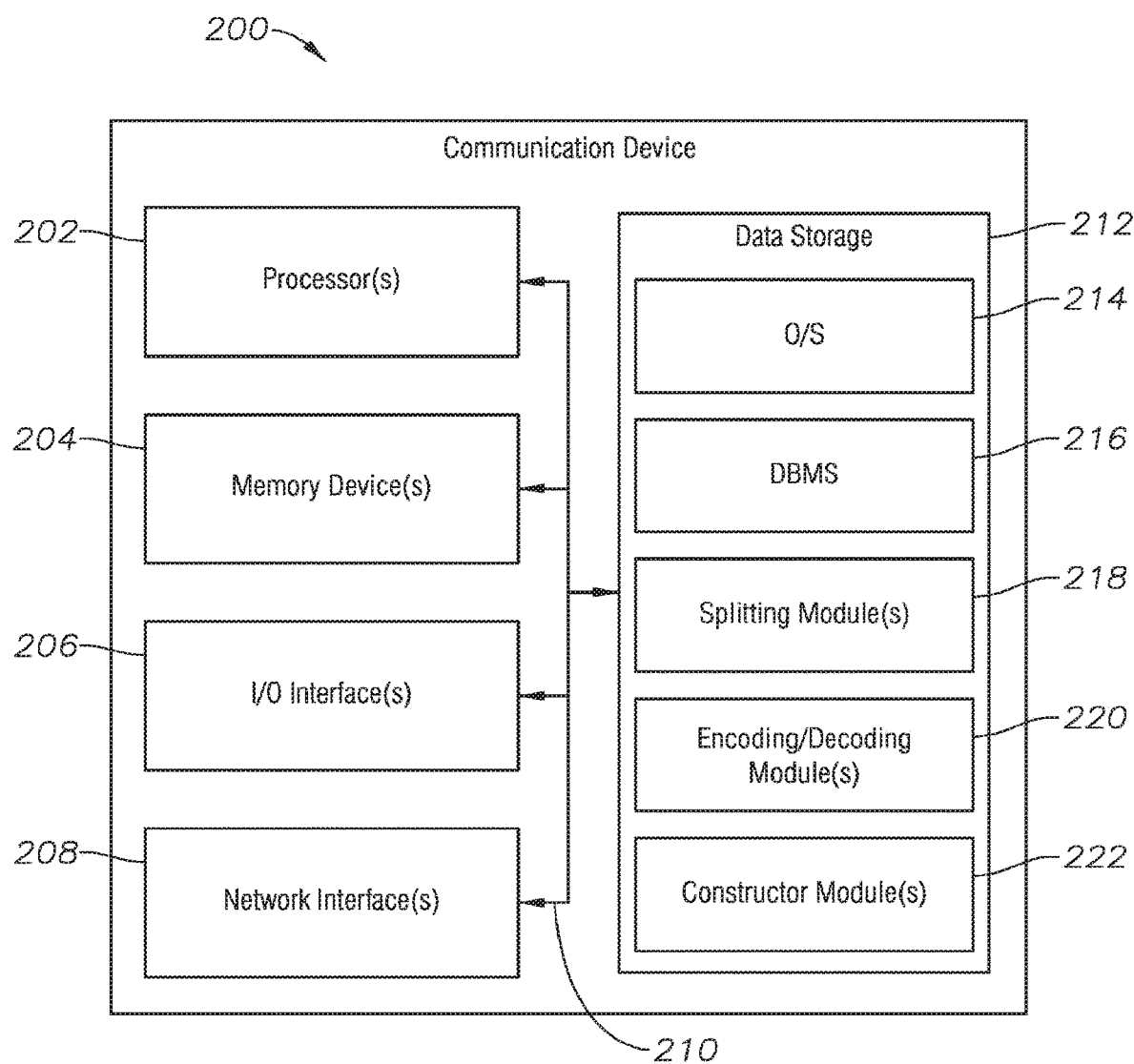
FIG. 11 is a schematic block diagram of an example communication device of a system, according to one or more example embodiments of the disclosure.

FIG. 11 is a schematic block diagram of an example communication device 200, such as the first communication device 120 or second communication device 140 of a system 100 in accordance with one or more example embodiments of the disclosure. In an illustrative configuration, the device 200 may include one or more processors (processor(s)) 202, one or more memory devices 204 (generically referred to herein as memory 204), one or more input/output ("I/O") interface(s) 206, one or more network interfaces 208, and data storage 212. The device 200 may further include one or more buses 210 that may functionally couple various components of the device 200. These various components will be described in more detail hereinafter.

The bus(es) 210 may include at least one of a system bus, a memory bus, an address bus, or a message bus, and may permit exchange of information (e.g., data (including computer-executable code), signaling, etc.) between various components of the device 200. The bus(es) 210 may have any of a variety of bus structures including, without limitation, a memory bus or a memory controller, a peripheral bus, an accelerated graphics port, and so forth. The bus(es) 210 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, a Serial Peripheral Interface architecture, and so forth.

The memory 204 of the device 200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 204 may include main memory as well as various forms of cache memory such as instruction cache(s), data cache(s), and translation lookaside buffer(s) (TLBs), and so forth. Further, cache memory such as a data cache may be a multi-level cache organized as a hierarchy of one or more cache levels (L1, L2, etc.).

The data storage 212 may include removable storage and/or non-removable storage including, but not limited to, magnetic storage, optical disk storage, and/or tape storage. The data storage 212 may include, for example, memory cards, USB flash drives, external hard disk drives, optical discs, and so forth. The data storage 212 may provide non-volatile storage of computer-executable instructions and other data. The memory 204 and the data storage 212, removable and/or non-removable, are examples of computer-readable storage media (CRSM) as that term is used herein.

The data storage 212 may store computer-executable code, instructions, or the like that may be loadable into the memory 204 and executable by the processor(s) 202 to cause various operations to be performed. In certain example embodiments, computer-executable code stored in the data storage 212 may be executable by the processor(s) 202 directly from the data storage 202. The data storage 212 may additionally store data that may be copied to memory 204 for use by the processor(s) 202 during the execution of the computer-executable instructions. Moreover, output data generated as a result of execution of the computer-executable instructions by the processor(s) 202 may be stored initially in memory 204, and may ultimately be copied to data storage 212 for non-volatile storage.

More specifically, the data storage 212 may store one or more operating systems (O/S) 214; one or more database management systems (DBMS) 216; and one or more program modules, applications, or the like such as, for example, one or more splitting modules 218, one or more encoding/decoding modules 220, and one or more constructor modules 222. Any of the modules depicted in FIG. 11 may include computer-executable code, instructions, or the like that may be loaded into the memory 204 for execution by one or more of the processor(s) 202.

The processor(s) 202 may be configured to access the memory 204 and execute computer-executable instructions loaded therein. For example, the processor(s) 202 may be configured to execute computer-executable instructions of the various program modules of the device 200 to cause or facilitate various operations to be performed in accordance with one or more embodiments of the disclosure. The processor(s) 202 may include any suitable processing unit capable of accepting data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 202 may be capable of supporting any of a variety of instruction sets.

Referring now to functionality that may be supported by the various program modules depicted as being stored in the data storage 212, the splitting module(s) 218, the encoding/decoding modules 220, and/or the constructor module(s) 222 may include computer-executable code, instructions, or the like for providing control plane functionality for making determinations regarding how network traffic between network devices is to be routed. Routing decisions may be based, for example, on any of a variety of factors such as network bandwidth, network congestion, and so forth. Additionally, or alternatively, the splitting module(s) 218 may include computer-executable code, instructions, or the like for identifying an appropriate network device (e.g., an access network termination device, a content server, etc.) for receiving and processing/responding to a request received from a terminal, and splitting the IP packet into data and command portions. The encoding/decoding module(s) 220 may additionally, or alternatively, include computer-executable code, instructions, or the like for encoding and/or decoding of a data portion and/or a command portion of an IP packet. The constructor module(s) 222 may additionally, or alternatively, include computer-executable code, instructions, or the like for identifying an appropriate network device for receipt of a request from a terminal, and combining a command portion and data portion into an IP packet.

Referring now to other illustrative components depicted in FIG. 11 as being stored in the data storage 212, the O/S 214 may be loaded from the data storage 212 into the memory 204 and may provide an interface between other application software executing on the device 200 and hardware resources of the device 200. More specifically, the O/S 214 may include a set of computer-executable instructions for managing hardware resources of the device 200 and for providing common services to other application programs (e.g., managing memory allocation among various application programs). The O/S 214 may include any operating system now known or which may be developed in the future including, but not limited to, any proprietary or non-proprietary operating system (e.g., a Linux based operating system).

The DBMS 216 may be also be loaded from the data storage 212 into the memory 204 and may support functionality for accessing, retrieving, storing, and/or manipulating data stored in one or more external datastores (not shown) and/or data stored in the data storage 212. The DBMS 216 may use any of a variety of database models (e.g., relational model, object model, etc.) and may support any of a variety of query languages. The datastore(s) may represent data in one or more data schemas and may include any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the device 200, one or more input/output (I/O) interfaces 206 may be provided that may facilitate the receipt of input information by the device 200 from one or more I/O devices as well as the output of information from the device 200 to the one or more I/O devices. The I/O devices may include, for example, one or more user interface devices that facilitate interaction between a user and the device 200 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth. The device 200 may further include one or more network interfaces 208 via which the device 200 may communicate with any of a variety of other systems, platforms, networks, devices, and so forth. The input/output interface(s) 206 and/or the network interface(s) 208 may include or otherwise facilitate communication via any of a variety of types of serial or parallel ports including, without limitation, an Ethernet port, a USB port, a High-Definition Multimedia Interface (HDMI) port, a Video Graphics Array (VGA) port, a coaxial RF connector (female), and so forth.

The network interface(s) 208 may facilitate communication between the device 200 and one or more other devices via any suitable type of network. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules, applications, computer-executable instructions, code, or the like depicted in FIG. 11 as being stored in the data storage 212 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 200, and/or hosted on other computing device(s) accessible via one or more networks, may be provided to support functionality provided by the program modules, applications, or computer-executable code depicted in FIG. 11 and/or additional or alternate functionality. Further, functionality may be modularized differently such that processing described as being supported collectively by the collection of program modules depicted in FIG. 11 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 11 may be implemented, at least partially, in hardware and/or firmware across any number of devices.

One example embodiment is a non-transitory computer-readable medium 204 including instructions stored thereon, which when executed by one or more processors 202 operatively coupled to the computer-readable medium 204, cause the one or more processors 202 of a first communication device 120 to perform operations including receiving an internet protocol (IP) packet via a first application programming interface (API) running on a first computer, dividing the IP packet into a command portion and a data portion, encoding the data portion into a text delimited non-IP format, and transmitting the encoded data portion and the command portion. The instructions may further cause the one or more processors to perform operations including receiving an encoded command portion and a data portion, decoding the encoded command portion into IP format, combining the decoded command portion and the data portion to regenerate a second IP packet, and transmitting the regenerated second IP packet.

Another example embodiment is a non-transitory computer-readable medium 204 including instructions stored thereon, which when executed by one or more processors 202 operatively coupled to the computer-readable medium 204, cause the one or more processors 202 of a second communication device 140 to perform operations including receiving an encoded data portion and a command portion, decoding the encoded data portion into IP format, combining the decoded data portion and the command portion to regenerate an IP packet, and transmitting the regenerated IP packet. The instructions may further cause the one or more processors to perform operations including receiving a second IP packet via a second API running on a second computer, dividing the second IP packet into a command portion and a data portion, determining if the command portion is whitelisted, encoding the command portion into a non-IP format if the command portion is whitelisted, and transmitting the encoded command portion and the data portion.

It should further be appreciated that the device 200 may include alternate and/or additional hardware, software, or firmware components beyond those described or depicted without departing from the scope of the disclosure. More particularly, it should be appreciated that software, firmware, or hardware components depicted as forming part of the device 200 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Figure 12:
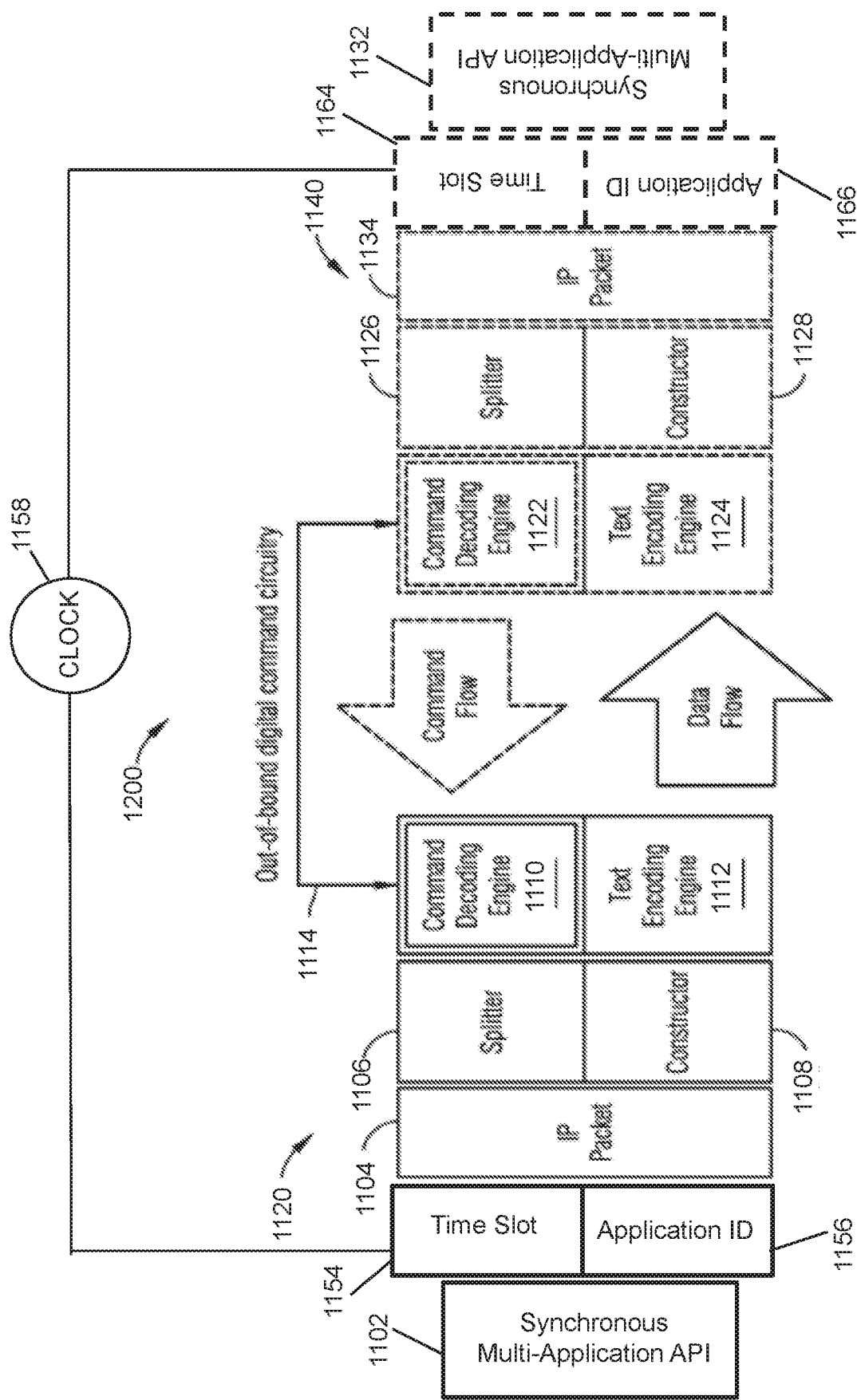
FIG. 12 illustrates on a high level components of a system for securely transmitting data between terminals connected via a computer network, according to one or more example embodiments of the disclosure.

FIG. 12 illustrates on a high level components of a system 1200 for securely transmitting selective datasets between terminals connected via a computer network, according to one or more example embodiments. The system 1200 includes a first communication device 1120 connected to a first computer, for example a sale module, on the network. The first communication device 1120 may include a first splitting unit 1106, a first text encoding and decoding unit 1112, a first command encoding and decoding unit 1110, a first constructor unit 1108, and a first transceiver (not shown) for sending and receiving IP packets over the network. The system 1200 may also include a second communication device 1140 connected to a second computer, for example a billing module, on the network. The second communication device 1140 may include a second splitting unit 1126, a second text encoding and decoding unit 1124, a second command encoding and decoding unit 1122, a second constructor unit 1128, and a second transceiver (not shown) for sending and receiving IP packets over the network. The first communication device 1120 may be configured to receive an internet protocol (IP) packet 1104 via a first synchronous multi-application programming interface (API) 1102 running on the first computer, divide the IP packet 1104 into a command portion and a data portion using the first splitting unit 1106, encode the data portion into a text delimited non-IP format using the first data encoding unit 1112, and transmit the encoded data portion and the command portion using the first transceiver. Although some embodiments refer to "data encoding" and "data decoding," it should be noted that "data" may include any form of data, including but not limited to "text."

The second communication device 1140 may be configured to receive the encoded data portion and the command portion, decode the encoded data portion into IP format using the second decoding unit 1124, combine the decoded data portion and the command portion to regenerate the IP packet using the second constructor unit 1128, and transmit the regenerated IP packet 1134 to a second synchronous multi-application API 1132 running on the second computer. The second communication device may further configured to receive a second IP packet 1134 via the second synchronous multi-application API 1132 running on the second computer, divide the second IP packet into a command portion and a data portion using the second splitting unit 1126, determine, using one or more processors in the second communication device 1140, if the command portion is whitelisted, encode the command portion into a non-IP format using the second command encoding unit 1122, and transmit the encoded command portion and the data portion using the second transceiver. The first communication device 1120 may then receive the encoded command portion and the data portion, decode the encoded command portion into IP format using the first decoding unit 1110, combine the decoded command portion and the data portion to regenerate the second IP packet using the first constructor unit 1108, and transmit the regenerated second IP packet 1104 to the first synchronous multi-application API 1102 running on the first computer. The data portion may include at least one of a customer name, customer address, fuel type, fuel price, and fuel quantity. The command portion may include at least one of a source address, destination address, and checksum, for data integrity. Encoding the command portion may include 3-bit encoding of the command portion using out of bound digital command circuitry 1114, for example.

As illustrated in FIG. 12, synchronous communication with multi-application support involves sharing the communication medium (i.e. multiplexing) using time slots 1154, 1164 so that each application, having an application ID 1156, 1166, can use the medium at a specific time based on a time slot allocation. These time slots 1154, 1164 are controlled by a common clock 1158 that is in control of the first computer 1120 and the second computer 1140, dictating which application can use the medium at a specific point in time.

This improved architecture is about implementing the support for an additional application or process that may have the ability to transmit as an example; extensive number of standards parameters, such as waiver requests and associated cost figures, potential safety or security implications, user's revision feedbacks and industry references to a system that resides on a "central" engineering facility that could perform intelligent correlation, prediction, and revision recommendation for the purpose of timely and continuously enhancing standards optimization process.

Large corporations and government entities maintain hundreds of standards spawning tens of technical discipline areas, such as building codes, communications, electrical, mechanical, automation, and cybersecurity. The probability of conflicting or misaligned standards requirements is considerable. This is because a close coordination and communication between standards committees is difficult to attain. To keep standards properly aligned requires tremendous efforts and tends to be time consuming.

The standards optimization system may include three components:

(A) Input Engine: An input engine housing a complete cause and effect analysis for the different functionalities and processes. Moreover, empirical data for the different variables contributing to the overall model are fed into an "input engine". The input engine comprises a multidimensional database which holds pluralities of records based on information such as complete compilation of industry standard controls (control by control), complete compilation of internal standard controls (control by control), comprehensive one-one mappings (between industry referenced standards and internal standards), number of waiver requests per standard, number of waiver requests per control in each standard, potential cost savings or implication associated with a waiver, potential safety or security implications associated with a waiver request, time since last optimization, standards revision requests, users' feedback on previous revisions process, result of industry standard overlay check (is control: "omitted", "relaxed", or "stringent"?), acceptable delta tolerance of less-than-optimal design requirements (i.e. 85%, 90%, 95%?)

The level of detail that is fed to the "input engine" is important to the accuracy and beneficial aspect of the automated optimization model. The more data, the better taking into consideration the granularity detailing of this information. An example of that is the initial requirements to dissect each standard into individual controls so that they are sequentially mapped into their counterparts in referenced industry standards creating an electronic "overlay" that can be later used by the "analysis engine". The same must be performed to other information records keeping in mind the same level of details. This might take some time in the beginning, but once completed, the outcome is a "treasure" worth of information with a profitable payback.

(B) Analysis Engine: The analysis engine maintains an access to the entire standards data warehousing created by the "input engine" for which thorough examinations, correlations and cross checks can be performed to fulfill a simple logic: Identify "standards" requiring immediate "optimization" affecting the following "controls", with foreseen "Cost Savings=$$", and "No safety/Security" implications. The objective of the "analysis engine" is to replace the manual decision making process of "when" to optimize a particular standard. The standards optimization process may no longer be reliant on arbitrary time cycles, nor on SME's own initiative behavior. The "analysis engine" call to initiate standards optimization process that may be substantiated with detailed report highlighting global cost savings figures, not only for one particular standard, but spanning the entire tree of standards library providing up-front return on investment figures.

However, because the database holds a record of each control for each standard, the "analysis engine" can easily spot potential conflicting or misaligned requirements even though they reside on two or more different standards. The mere ability of determining overlaps or misaligned controls is considered a great achievement toward Operational Excellency (OE). A sample misaligned record is shown here as an example.

| Standard (x)-Committee: Industrial Security | | Standard (y)-Committee: Cybersecurity | |
|---|---|---|---|
| Control 1.1 | Minimum access requirement = Combination lock | Control 5.4 | Minimum access requirement = Biometric |

In other cases, certain design requirements are duplicated in different standards. In this case, the controls are matching however, they are required by more than one standard. The "analysis engine" is able to spot and identify overlaps and present them as part of their reporting mechanism. A sample overlapping record is shown here as an example.

| Standard (x)-Committee: Automation | | Standard (y)-Committee: Cybersecurity | |
|---|---|---|---|
| Control 8.6 | Full Data Backup = 6 months | Control 4.4 | Full Data Backup = 6 months |

The correlation of information between the controls in various standards can be implemented via a multidimensional intelligence logic based on keyword recognition, indexing under a functional criteria and any other element that would foster an intelligent logic. For example, a minimum compressive strength requirement of 4000 PSI concrete in building code standard and IP camera minimum outdoor temperature support of 55 degrees, can be indexed under "robustness."

The analysis engine is further equipped with a complementarily component performing a proactive reporting and alerting logic that may continuously monitor standards optimization index and generate an alert if certain thresholds are reached. The alert is triggered by dynamic or fixed threshold the end user can define proactively. The alerts can be communicated via email or displayed over electronic dashboard.

An Example

An internal security standard requires 8-character long password for control system installation. The referenced international standard requires only 7-character long password measure. The already installed system is not capable to support the standard requirement of 8-character long and thus a waiver request is initiated. The analysis can be given as follows: The requirement of 8-character password is "stringent" when compared to international standard. The waiver process may provide huge cost avoidance as the only way to comply with this requirement is upgrade or replace the system. Impact on safety and security is 'minimal". A sample standard overlay record is shown here as an example.

| International standard (X) | | Local standard (Y) | | |
|---|---|---|---|---|
| Control (x) | Value (x) | Control (y) | Value (y) | Measure |
| Control 1.1 | Min Password length = 7 | Control 2.12 | Min Password Length = 8 | Stringent |
| Control 1.2 | Fiber Optic requires separate trench = yes | Control 2.13 | Fiber Optic requires separate trench = no | Relaxed |
| Control 1.4 | Application Whitelisting = yes | N/A | N/A | Omitted |

A sample waiver request record is shown here as an example.

| Waiver Request Local standard (000) | | | | | |
|---|---|---|---|---|---|
| Control (y) | Value (y) | Reason | Cost Savings or Implication | Quality ( ) | Impact on Safety/ Security |
| Control 2.12 | Min Password Length = 8 | Not supported | Huge. Requires system replacement or upgrade | Minor effect. 95% | Safety = 0 [1 . . . 10] Security = 2 [1 . . . 10] |

(C) Advisory Engine: The advisory engine suggests the actual plan detailing the required change or modification to the standard. While the "analysis engine" provides the data for the "need" to revise or optimize a standard, the "advisory engine" goes further by improvising the "Action Plan". For example, in manual standards optimization process, the responsible SME may call in for a "Value Engineering (VE)" session exercise for standards under his jurisdiction. A meeting request is transmitted to all other SME's who participated in the original development efforts of the subject standard to re-visit [Value versus Cost] analysis. Consequently, a business decision may have to follow on whether the subject standard should be maintained or eliminated. The VE process is an essential part of ensuring quality of the standards and maintaining their value, however, the process is very expensive in terms of manpower, time and logistics. As part of the functionality of "advisory engine", a method is presented to provide an automation to the value engineering process, so that it can be carried out more frequently minus the cost in terms of manpower, time and logistics.

Value engineering is a systematic method to improve the "value" of goods or products and services by using an examination of function. Value, as defined, is the ratio of function to cost. Value can therefore be increased by either improving the function or reducing the cost. It is a primary tenet of value engineering that basic functions be preserved and not be reduced as a consequence of pursuing value improvements.

The reasoning behind value engineering is as follows: if marketers expect a product to become practically or stylistically obsolete within a specific length of time, they can design it to only last for that specific lifetime. The products could be built with higher-grade components, but with value engineering they are not because this would impose an unnecessary cost on the manufacturer, and to a limited extent also an increased cost on the purchaser. Value engineering may reduce these costs. A company may typically use the least expensive components that satisfy the product's lifetime projections.

Figure 13:
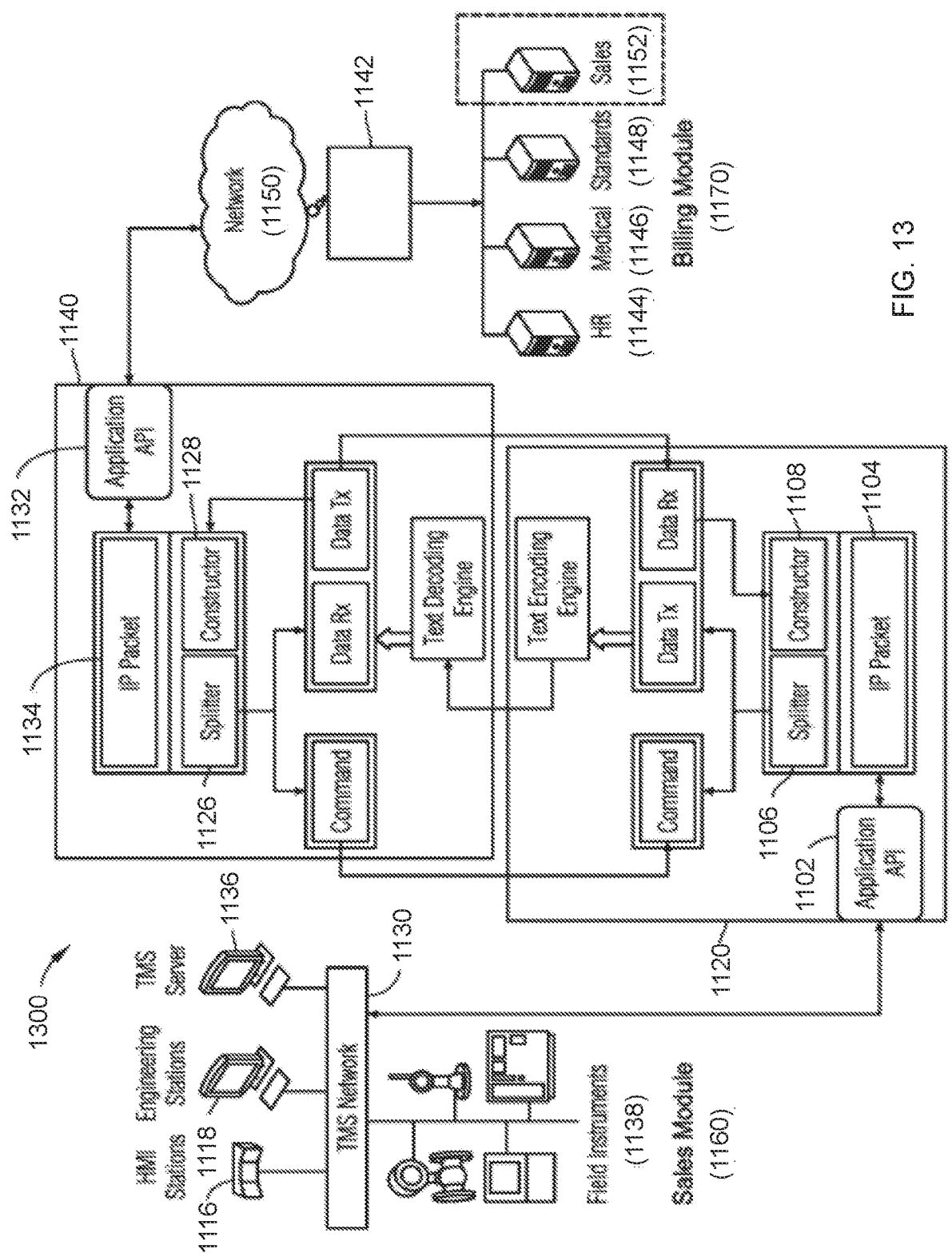
FIG. 13 illustrates architecture of system for securely transmitting data between terminals connected via a computer network, which includes a sales module and a billing module, according to one or more example embodiments of the disclosure.

FIG. 13 illustrates architecture of system 1300 in further detail, which includes a sales module 1160 and a billing module 1170, according to one or more example embodiments. The sales module 1160 may include one or more computers, such as TMS servers 1136, engineering stations 1118, and human machine interface (HMI) stations 1116, which may be connected via TMS network 1130, for example. The sales module 1160 may also include field instruments that may be connected to the TMS network 1130. The billing module 1170 may include one or more computers, such as HR server 1144, medical records server 1146, standards server 1148, and sales server 1152, which may be connected to a network 1150 via an interface 1142, such as SAP or any enterprise software that can manage business operations and customer relations. Networks 1130, 1150 may include any computer network including but not limited to LAN, WAN, DSL network, and wireless networks such as Wi-Fi, 3G, 4G, and 4G LTE.

The system 1300 includes a first communication device 1120 connected to a first computer, for example a sale module, on the network. The first communication device 1120 may include a first splitting unit 1106, a first text encoding and decoding unit 1112, a first command encoding and decoding unit 1110, a first constructor unit 1108, and a first transceiver (not shown) for sending and receiving IP packets over the network. The system 1300 may also include a second communication device 1140 connected to a second computer, for example a billing module, on the network. The second communication device 1140 may include a second splitting unit 1126, a second text encoding and decoding unit 1124, a second command encoding and decoding unit 1122, a second constructor unit 1128, and a second transceiver (not shown) for sending and receiving IP packets over the network. The first communication device 1120 may be configured to receive an internet protocol (IP) packet 1104 via a first synchronous multi-application programming interface (API) 1102 running on the first computer, divide the IP packet 1104 into a command portion and a data portion using the first splitting unit 1106, encode the data portion into a text delimited non-IP format using the first text encoding unit 1112, and transmit the encoded data portion and the command portion using the first transceiver.

The second communication device 1140 may be configured to receive the encoded data portion and the command portion, decode the encoded data portion into IP format using the second decoding unit 1124, combine the decoded data portion and the command portion to regenerate the IP packet using the second constructor unit 1128, and transmit the regenerated IP packet 1134 to a second synchronous multi-application API 1132 running on the second computer. The second communication device may further configured to receive a second IP packet 1134 via the second synchronous multi-application API 1132 running on the second computer, divide the second IP packet into a command portion and a data portion using the second splitting unit 1126, determine, using one or more processors in the second communication device 1140, if the command portion is whitelisted, encode the command portion into a non-IP format using the second command encoding unit 1122, and transmit the encoded command portion and the data portion using the second transceiver. The first communication device 1120 may then receive the encoded command portion and the data portion, decode the encoded command portion into IP format using the first decoding unit 1110, combine the decoded command portion and the data portion to regenerate the second IP packet using the first constructor unit 1108, and transmit the regenerated second IP packet 1104 to the first synchronous multi-application API 1102 running on the first computer. The data portion may include at least one of a customer name, customer address, fuel type, fuel price, and fuel quantity. The command portion may include at least one of a source address, destination address, and checksum, for data integrity.

Figure 14:
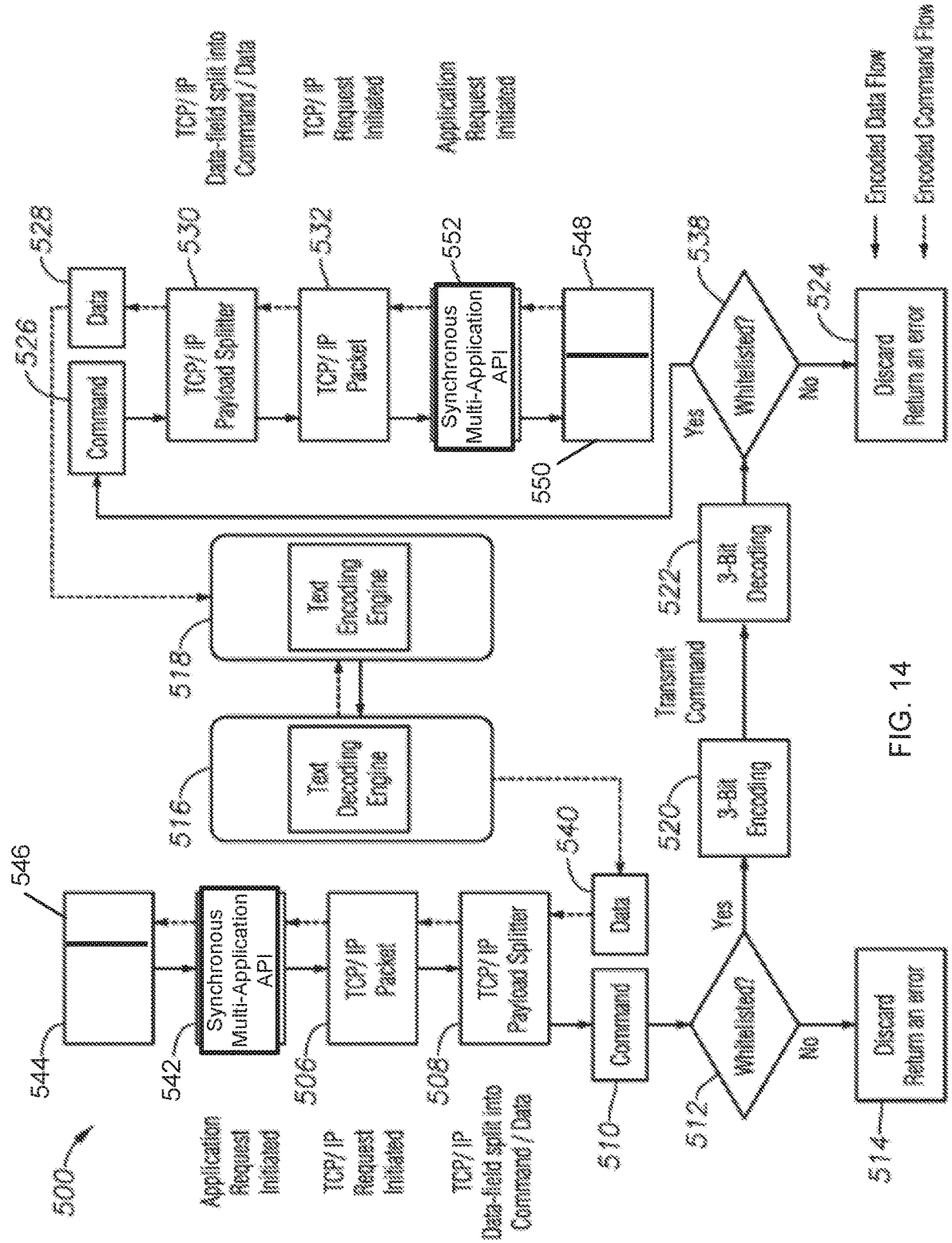
FIG. 14 illustrates a logic diagram for a method for securely transmitting data between terminals connected via a computer network, according to one or more example embodiments of the disclosure.

FIG. 14 illustrates a logic diagram for a method 500 for securely transmitting selective datasets between terminals connected via a computer network. The method 500 includes receiving, by a first communication device, an internet protocol (IP) packet 532 via a first synchronous multi-application programming interface (API) 552 running on a first computer. The first API 552 may be running multiple applications, such as a corporate billing module 548 and a standards optimization module 550. The method 500 further includes dividing, by a splitting unit 530 in the first communication device, the IP packet into a command portion 526 and a data portion 528. The method 500 may also include encoding, by a data encoding unit 518 in the first communication device, the data portion into a text delimited non-IP format, and transmitting, by a transmitting unit (not shown) in the first communication device, the encoded data portion and the command portion. The method 500 may also include receiving the encoded data portion and the command portion by a second communication device running a second synchronous multi-application API 542, which may be running multiple applications such as a corporate billing module 544 and a standards optimization module 546. The method may further include decoding, by a data decoding unit 516 in the second communication device, the encoded data portion 540 into IP format. The method 500 also includes combining, by a constructor unit 508 in the second communication device, the decoded data portion 540 and the command portion 510 to regenerate the IP packet 506, and receiving the regenerated IP packet by the second synchronous multi-application API 542 running on the second computer.

The method 500 may also include receiving, by the second communication device 544, 546, a second IP packet 506 via the second synchronous multi-application API 542 running on the second computer, dividing, by a splitting unit 508 in the second communication device, the second IP packet 506 into a command portion 510 and a data portion 540. The method also includes determining at step 512, by one or more processors in the second communication device, if the command portion 510 is whitelisted, and encoding at step 520, by a command encoding unit in the second communication device, the command portion 510 into a non-IP format if the command portion is whitelisted, and transmitting at step 538, by a transmitting unit in the second communication device, the encoded command portion 526 and the data portion 528. In the event the command portion is not whitelisted, then the method returns an error message at steps 514 and 524, respectively. The method 500 may also include receiving, by the first communication device, the encoded command portion 526 and the data portion 528, decoding, by a command decoding unit 522 in the first communication device, the encoded command portion into IP format, combining, by a constructor unit 530 in the first communication device, the decoded command portion and the data portion to regenerate the second IP packet 532, and receiving, by the first synchronous multi-application API 552 running on the first computer, the regenerated second IP packet. The data portion 528, 540 may include at least one of a customer name, customer address, fuel type, fuel price, and fuel quantity. The command portion 510, 526 may include at least one of a source address, destination address, and checksum, for data integrity. The encoding of the command portion may include 3-bit encoding 520 of the command portion using out of bound digital command circuitry, for example.

In addition, it should be appreciated that the operations described and depicted in FIG. 14 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIG. 14 may be performed.

Another example embodiment is a secure method for transmitting bulk plant sales ticketing information from a TMS to a corporations billing and sales module. The method is based on breaking a TCP/IP session between bulk plant TMS system and corporate sales computer, extracting the data field and eventually transmitting the sales data in "text" delimited format by the use of an IP-text encoding/decoding apparatus. Although example embodiments described herein relate to the field of petrochemical, oil, gas, and chemical processing industries, the invention is not limited as such and can be applied to any two terminals or computers connected via a computer network.

The method works by encoding the sales figures as part of the data field of TCP/IP packet originating from bulk plant ticketing system into a text format, and then uploading them onto enterprise sales module after decoding them back to TCP/IP packet format, thus eliminating the potential hacking and spread of malware and viruses between the bulk plant and corporate sales systems. The method may also work for any other application where the required input data is to fill out the fields in a database record structure such as Custody Transfer, Asset Management, Product Inventories, etc.

Some of the advantages of the above example embodiments include added data security due to added data privacy, added data authentication, added data integrity, and added data validity. For example, the added data privacy is due to the indication that the transmitted information can only be viewed by its rightful recipients. Although a third party may be able to access a copy of the message sent, they will not be able to make sense of it. Added data authentication is provided because the transmission technique takes into consideration applicable measures to ensure the "identity" of both the sender and receiver of the transmitted data. Added data integrity is provided because the transmission technique takes into consideration applicable measures to ensure the overall "integrity" of the transmitted data and that it arrives at its destination unchanged. Added data validity is provided because the transmission technique takes into consideration applicable measures to ensure overall "validity" and sanity of the transmitted data and that it can accordingly be processed. In some embodiments, hardware and software based whitelisting measures, in addition to data format conversion methods, are used to ensure that data arrives within the expected parameters of an application.

Secondly, the above example embodiments provide added communication security, for example, added security of the transmitting medium. The above example embodiments provide a connectionless transmission. For example, a communication methodology between two network end points in which data can be sent from one end point to another without establishing a session. A "connectionless'" device typically breaks the network session and uses a non-conventional data delivery method between end devices such as the case in data-diodes. The above example embodiments also provide selective data transmission. For example, the transmission medium is pre-programmed to transmit selective data fields required by the application using packet stripping and data extraction techniques. The "selective data transmission" method omits other fields that could potentially be used to transport malware and viruses.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the following description. Other features and advantages of the disclosure will be apparent from the description and drawings, and from the claims.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A method for securely transmitting data between two terminals connected via a computer network, the method comprising:

receiving, by a first communication device of the two terminals, an internet protocol (IP) packet via a first synchronous multi-application programming interface (API) running on a first computer;

dividing, by a splitting unit in the first communication device, the IP packet into a command portion and a data portion, wherein the data portion comprises at least one of a customer name, customer address, fuel type, fuel price and fuel quantity;

encoding, by a data encoding unit in the first communication device, the data portion into a text delimited non-IP format; and transmitting, by a transmitting unit in the first communication device, the encoded data portion and the command portion to a second communication device from the two terminals;

receiving, by the second communication device, a second IP packet via a second synchronous multi-application API running on the second computer;

dividing, by a splitting unit in the second communication device, the second IP packet into a command portion and a data portion;

determining, by one or more processors in the second communication device, when the command portion is whitelisted;

encoding by a command encoding unit in the second communication device, the command portion into a non-IP format when the command portion is whitelisted; and transmitting, by a transmitting unit in the second communication device, the encoded command portion and the data portion.

2. The method of claim 1, wherein the first synchronous multi-application API or the second synchronous multi-application API includes a corporate billing module and a standards optimization module.

3. The method of claim 2, wherein the standards optimization module further comprises:
an input engine configured to receive a standard;
an analysis engine configured to analyze the standard; and
an advisory engine configured to modify the standard or suggest a modification to the standard.

4. The method of claim 1, further comprising:
receiving, by a second communication device, the encoded data portion and the command portion;
decoding, by a data decoding unit in the second communication device, the encoded data portion into IP format;
combining, by a constructor unit in the second communication device, the decoded data portion and the command portion to regenerate the IP packet; and
receiving, by a second synchronous multi-application API running on a second computer, the regenerated IP packet.

5. The method of claim 1, further comprising:
receiving, by the first communication device, the encoded command portion and the data portion;
decoding, by a command decoding unit in the first communication device, the encoded command portion into IP format;
combining, by a constructor unit in the first communication device, the decoded command portion and the data portion to regenerate the second IP packet; and
receiving, by the first synchronous multi-application API running on the first computer, the regenerated second IP packet.

6. The method of claim 1, wherein the command portion comprises at least one of a source address, destination address, and checksum, for data integrity.

7. The method of claim 1, wherein encoding the command portion comprises 3-bit encoding of the command portion using out of bound digital command circuitry.

8. The method of claim 1, wherein the encoding is selected from the group consisting of dual frequency tone encoding, 4-20 mA encoding, millivolt encoding, and light pulse repetition frequency encoding.

9. A system for securely transmitting data between two terminals connected via a computer network, the system comprising:
a first communication device of the two terminals connected to a first computer on the network, the first communication device comprising memory, a first splitting unit, a first data encoding and decoding unit, a first command encoding and decoding unit, a first constructor unit, and a first transceiver for sending and receiving IP packets over the network;
a second communication device from the two terminals connected to a second computer on the network, the second communication device comprising a second splitting unit, a second data encoding and decoding unit, a second command encoding and decoding unit, a second constructor unit, and a second transceiver for sending and receiving IP packets over the network; and
a common clock configured to access a time slot and an application ID in the first communication device and the second communication device,
wherein the first communication device is configured to:
receive an interne protocol (IP) packet via a first synchronous multi-application programming interface (API) running on the first computer;
divide the IP packet into a command portion and a data portion using the first splitting unit, wherein the data portion comprises at least one of a customer name, customer address, fuel type, fuel price and fuel quantity;
encode the data portion into a text delimited non-IP format using the first data encoding unit; and
transmit the encoded data portion and the command portion using the first transceiver to the second communication device;
wherein the second communication device is further configured to:
receive a second IP packet into a command and a data portion using the second splitting unit;
determine, using one or more processors in the second communication device, when the command portion is whitelisted;
encode the command portion in to a non-IP format using the second command encoding unit; and
transmit the encoded command portion and the data portion using the second transceiver.

10. The system of claim 1, wherein the first synchronous multi-application API or the second synchronous multi-application API includes a corporate billing module and a standards optimization module.

11. The system of claim 10, wherein the standards optimization module further comprises:
an input engine configured to receive a standard;
an analysis engine configured to analyze the standard; and
an advisory engine configured to modify the standard or suggest a modification to the standard.

12. The system of claim 9, wherein the second communication device is configured to:
receive the encoded data portion and the command portion;
decode the encoded data portion into IP format using the second decoding unit;
combine the decoded data portion and the command portion to regenerate the IP packet using the second constructor unit; and
transmit the regenerated IP packet to a second synchronous multi-application API running on the second computer.

13. The system of claim 9, wherein the first communication device is further configured to:
receive the encoded command portion and the data portion;
decode the encoded command portion into IP format using the first decoding unit;
combine the decoded command portion and the data portion to regenerate the second IP packet using the first constructor unit; and
transmit the regenerated second IP packet to the first synchronous multi-application API running on the first computer.

14. The system of claim 9, wherein the command portion comprises at least one of a source address, destination address, and checksum, for data integrity.

15. The system of claim 9, wherein encoding the command portion comprises 3-bit encoding of the command portion using out of bound digital command circuitry.

16. The system of claim 9, wherein the encoding is selected from the group consisting of dual frequency tone encoding, 4-20 mA encoding, millivolt encoding, and light pulse repetition frequency encoding.

17. A non-transitory computer-readable medium including instructions stored thereon, which when executed by one or more processors operatively coupled to the computer-readable medium, cause the one or more processors to perform operations for securely transmitting data between two terminals connected via a computer network, wherein the operations comprise:
receiving an internet protocol (IP) packet via a first synchronous multi-application programming interface (API) running on a first computer of the two terminals;
dividing the IP packet into a command portion and a data portion, wherein the data portion comprises at least one of a customer name, customer address, fuel type, fuel price and fuel quantity;
encoding the data portion into a text delimited non-IP format; and
transmitting the encoded data portion and the command portion to a second computer of the two terminals;
receiving, by the second computer, a second IP packet via a second synchronous multi-application API running on the second computer;
dividing, by the second computer, the second IP packet into a command portion and a data portion;
determining, by the second computer, when the command portion is whitelisted;
encoding, by the second computer, the command portion into a non-IP format when the command portion is whitelisted; and
transmitting, by the second computer, the encoded command portion and the data portion.

18. The medium of claim 17, wherein the first synchronous multi-application API or the second synchronous multi-application API includes a corporate billing module and a standards optimization module.

19. The medium of claim 18, wherein the standards optimization module further comprises:
an input engine configured to receive a standard;
an analysis engine configured to analyze the standard; and
an advisory engine configured to modify the standard or suggest a modification to the standard.

20. The medium of claim 17, further causing the one or more processors to perform operations comprising:
receiving an encoded command portion and a data portion;
decoding the encoded command portion into IP format;
combining the decoded command portion and the data portion to regenerate a second IP packet; and
transmitting the regenerated second IP packet.

21. The medium of claim 17, further causing the one or more processors to perform operations comprising:
receiving an encoded data portion and a command portion;
decoding the encoded data portion into IP format;
combining the decoded data portion and the command portion to regenerate an IP packet; and
transmitting the regenerated IP packet.

22. The medium of claim 21, further causing the one or more processors to perform operations comprising:
receiving a second IP packet via a second synchronous multi-application API running on a second computer;
dividing the second IP packet into a command portion and a data portion;
determining if the command portion is whitelisted;
encoding the command portion into a non-IP format if the command portion is whitelisted; and
transmitting the encoded command portion and the data portion.

* * * * *

UNITED STATES PATENT AND TRADEMARK OFFICE
CERTIFICATE OF CORRECTION

PATENT NO. : 10,931,790 B2
APPLICATION NO. : 16/502212
DATED : February 23, 2021
INVENTOR(S) : Alkhabbaz et al.

Page 1 of 1

It is certified that error appears in the above-identified patent and that said Letters Patent is hereby corrected as shown below:

In the Claims

In Column 30, Claim 9, Line 22 should read:
-- receive an internet protocol (IP) packet via a first synchronous --

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*